US009269221B2

(12) United States Patent
Gobbi et al.

(10) Patent No.: US 9,269,221 B2
(45) Date of Patent: Feb. 23, 2016

(54) CONFIGURATION OF INTERFACES FOR A LOCATION DETECTION SYSTEM AND APPLICATION

(76) Inventors: John J. Gobbi, Bend, OR (US); Bryan Kelly, Alamo, CA (US); David L. Brown, Jupiter, FL (US); Fred S. Hirt, Brookfield, IL (US)

( * ) Notice: Subject to any disclaimer, the term of this patent is extended or adjusted under 35 U.S.C. 154(b) by 1191 days.

(21) Appl. No.: 11/939,427

(22) Filed: Nov. 13, 2007

(65) Prior Publication Data

US 2008/0150678 A1 Jun. 26, 2008

Related U.S. Application Data

(60) Provisional application No. 60/865,596, filed on Nov. 13, 2006.

(51) Int. Cl.
*G06F 7/00* (2006.01)
*G07F 17/32* (2006.01)

(52) U.S. Cl.
CPC ............ *G07F 17/3218* (2013.01); *G07F 17/32* (2013.01); *G07F 17/3239* (2013.01)

(58) Field of Classification Search
USPC .................................................. 235/376, 383
See application file for complete search history.

(56) References Cited

U.S. PATENT DOCUMENTS 4,759,060 A 7/1988 Hayashi et al.
5,187,352 A 2/1993 Blair et al.
5,296,641 A 3/1994 Stelzel
5,392,433 A 2/1995 Hammersley et al.
5,422,632 A 6/1995 Bucholtz et al.
5,450,489 A 9/1995 Ostrover et al.
5,619,251 A 4/1997 Kuroiwa et al.
5,629,980 A 5/1997 Stefik et al.

(Continued)

FOREIGN PATENT DOCUMENTS

WO WO 00/62505 A1 10/2000
WO WO 01/22724 A1 3/2001

(Continued)

OTHER PUBLICATIONS

"Alliance Activities: Publications: Identity- Smart Card Alliance," Smart Card Alliance, 1997-2007, [online] [Retrieved on Jan. 7, 2007] Retrieved from the Internet<URL:http://www.smartcardalliance.org/pages/publications-identity>.

(Continued)

*Primary Examiner* — Rafferty Kelly
(74) *Attorney, Agent, or Firm* — Patent Law Works LLP

(57) ABSTRACT

A system and method provides efficient and highly reliable customer and asset tracking. A Personal Digital Key (PDK) is associated with and carried by a user or fixed to an asset. The PDK wirelessly communicates with a receiver/decoder circuit (RDC) that can be coupled to a variety of electronic devices. The RDC authenticates the PDK based on received data and stores information to track customers and provide improved service. The RDC can be coupled to or integrated with a variety of electronic devices. The operation of the electronic device is determined based on an identification code of the detected PDK and an identification code of the RDC. The electronic device, the PDK or both can be configured with a personalized user interface and execute specific functions based on stored state information associated with the PDK and RDC identification codes.

28 Claims, 22 Drawing Sheets

(56) References Cited

U.S. PATENT DOCUMENTS

| | | | | |
|---|---|---|---|---|
| 5,644,354 | A | 7/1997 | Thompson et al. | |
| 5,666,412 | A | 9/1997 | Handelman et al. | |
| 5,773,954 | A * | 6/1998 | VanHorn | 320/137 |
| 5,784,464 | A | 7/1998 | Akiyama et al. | |
| 5,825,876 | A | 10/1998 | Peterson, Jr. | |
| 5,857,020 | A | 1/1999 | Peterson, Jr. | |
| 5,892,825 | A | 4/1999 | Mages et al. | |
| 5,894,551 | A | 4/1999 | Huggins et al. | |
| 5,898,880 | A | 4/1999 | Ryu | |
| 5,928,327 | A | 7/1999 | Wang et al. | |
| 5,991,399 | A | 11/1999 | Graunke et al. | |
| 5,991,749 | A | 11/1999 | Morrill, Jr. | |
| 6,035,038 | A | 3/2000 | Campinos et al. | |
| 6,035,329 | A | 3/2000 | Mages et al. | |
| 6,041,410 | A | 3/2000 | Hsu et al. | |
| 6,055,314 | A | 4/2000 | Spies et al. | |
| 6,070,796 | A | 6/2000 | Sirbu | |
| 6,088,730 | A | 7/2000 | Kato et al. | |
| 6,104,334 | A | 8/2000 | Allport | |
| 6,110,041 | A * | 8/2000 | Walker et al. | 463/20 |
| 6,148,142 | A | 11/2000 | Anderson | |
| 6,161,179 | A | 12/2000 | Seidel | |
| 6,209,089 | B1 | 3/2001 | Selitrennikoff et al. | |
| 6,219,109 | B1 | 4/2001 | Raynesford et al. | |
| 6,247,130 | B1 | 6/2001 | Fritsch | |
| 6,266,415 | B1 | 7/2001 | Campinos et al. | |
| 6,295,057 | B1 | 9/2001 | Rosin et al. | |
| 6,336,121 | B1 | 1/2002 | Lyson et al. | |
| 6,336,142 | B1 | 1/2002 | Kato et al. | |
| 6,367,019 | B1 | 4/2002 | Ansell et al. | |
| 6,381,747 | B1 | 4/2002 | Wonfor et al. | |
| 6,385,596 | B1 | 5/2002 | Wiser et al. | |
| 6,392,664 | B1 | 5/2002 | White et al. | |
| 6,397,387 | B1 | 5/2002 | Rosin et al. | |
| 6,401,059 | B1 | 6/2002 | Shen et al. | |
| 6,411,307 | B1 | 6/2002 | Rosin et al. | |
| 6,424,715 | B1 | 7/2002 | Saito | |
| 6,425,084 | B1 | 7/2002 | Rallis et al. | |
| 6,434,535 | B1 | 8/2002 | Kupka et al. | |
| 6,446,130 | B1 | 9/2002 | Grapes | |
| 6,463,534 | B1 | 10/2002 | Geiger et al. | |
| 6,480,188 | B1 | 11/2002 | Horsley | |
| 6,490,443 | B1 | 12/2002 | Freeny, Jr. | |
| 6,510,350 | B1 | 1/2003 | Steen, III et al. | |
| 6,523,113 | B1 | 2/2003 | Wehrenberg | |
| 6,529,949 | B1 | 3/2003 | Getsin et al. | |
| 6,546,418 | B2 | 4/2003 | Schena et al. | |
| 6,550,011 | B1 | 4/2003 | Sims, III | |
| 6,563,805 | B1 | 5/2003 | Ma et al. | |
| 6,564,380 | B1 | 5/2003 | Murphy | |
| 6,628,302 | B2 | 9/2003 | White et al. | |
| 6,632,992 | B2 | 10/2003 | Hasegawa | |
| 6,647,417 | B1 | 11/2003 | Hunter et al. | |
| 6,667,684 | B1 | 12/2003 | Waggamon et al. | |
| 6,683,954 | B1 | 1/2004 | Searle | |
| 6,697,944 | B1 | 2/2004 | Jones et al. | |
| 6,711,464 | B1 | 3/2004 | Yap et al. | |
| 6,775,655 | B1 | 8/2004 | Peinado et al. | |
| 6,804,825 | B1 | 10/2004 | White et al. | |
| 6,806,887 | B2 | 10/2004 | Chernock et al. | |
| 6,850,147 | B2 | 2/2005 | Prokoski et al. | |
| 6,873,975 | B1 | 3/2005 | Hatakeyama et al. | |
| 6,879,567 | B2 | 4/2005 | Callaway et al. | |
| 6,950,941 | B1 | 9/2005 | Lee et al. | |
| 6,957,086 | B2 | 10/2005 | Bahl et al. | |
| 6,973,576 | B2 | 12/2005 | Giobbi | |
| 6,975,202 | B1 | 12/2005 | Rodriguez et al. | |
| 7,012,503 | B2 | 3/2006 | Nielsen | |
| 7,159,765 | B2 * | 1/2007 | Frerking | 235/375 |
| 7,249,177 | B1 | 7/2007 | Miller | |
| 7,305,560 | B2 | 12/2007 | Giobbi | |
| 2002/0007456 | A1 | 1/2002 | Peinado et al. | |
| 2002/0013772 | A1 | 1/2002 | Peinado | |
| 2002/0015494 | A1 | 2/2002 | Nagai et al. | |
| 2002/0026424 | A1 | 2/2002 | Akashi | |
| 2002/0073042 | A1 | 6/2002 | Maritzen et al. | |
| 2002/0104006 | A1 | 8/2002 | Boate et al. | |
| 2002/0108049 | A1 | 8/2002 | Xu et al. | |
| 2002/0109580 | A1 | 8/2002 | Shreve et al. | |
| 2003/0055689 | A1 | 3/2003 | Block et al. | |
| 2003/0213840 | A1 * | 11/2003 | Livingston et al. | 235/375 |
| 2004/0129787 | A1 | 7/2004 | Saito et al. | |
| 2005/0090200 | A1 | 4/2005 | Karaoguz et al. | |
| 2005/0116020 | A1 * | 6/2005 | Smolucha et al. | 235/375 |
| 2006/0111955 | A1 * | 5/2006 | Winter et al. | 705/8 |
| 2006/0113381 | A1 | 6/2006 | Hochstein et al. | |
| 2006/0136742 | A1 | 6/2006 | Giobbi | |
| 2006/0208066 | A1 | 9/2006 | Finn et al. | |
| 2007/0159994 | A1 | 7/2007 | Brown et al. | |
| 2007/0174809 | A1 | 7/2007 | Brown et al. | |
| 2007/0271194 | A1 | 11/2007 | Walker et al. | |

FOREIGN PATENT DOCUMENTS

| | | | |
|---|---|---|---|
| WO | WO 01/75876 | A1 | 10/2001 |
| WO | WO 01/77790 | A1 | 10/2001 |
| WO | WO 2005/050450 | A1 | 6/2005 |
| WO | WO 2005/086802 | A2 | 9/2005 |

OTHER PUBLICATIONS

Antonoff, Michael, "Visiting Video Valley," Sound & Vision, pp. 116 and 118-119, Nov. 2001.

"Applying Biometrics to Door Access," Security Magazine, Sep. 26, 2002 [online] [Retrieved on Jan. 7, 2007] Retrieved from the Internet<URL:http://www.securitymagazine.com/CDA/Articles/Technologies/3ae610eaa34d8010VgnVCM100000f932a8c0>.

Article, "In the Age of Napster, Protecting Copyright is a Digital Arms Race," Wall Street Journal, Jul. 25, 2000.

Article, "Sound Waves Could Help Ease Web-Fraud Woes," Wall Street Journal, Aug. 14, 2000.

Blum, Jonathan, "Digital Rights Management May Solver the Napster "Problem"," Technology Investor Industrysector, (Oct. 2000), 24-27.

Debow, Credit/Debit Debuts in Midwest Smart Card Test, Computers in Banking, v6, n11, p. 10, Nov. 1989.

Dennis, Digital Passports Need Not Infringe Civil Liberties, Newsbytes, Dec. 2, 1999, 2 pages.

Fasca, Chad, "The Circuit," Electronic News, 45(45) (Nov. 8, 1999), 20.

Firecrest Shows How Truly Commercially-Minded Companies Will Exploit the Internet, Computergram International, Jan. 18, 1996.

"Frequently Asked Questions (FAQs) About BioPay," BioPay, LLC, 2007, [online] [Retrieved on Jan. 7, 2007] Retrieved from the Internet<URL:http://www.biopay.com/faqs-lowes.asp>.

Lake, Matt, "Downloading for Dollars," Sound & Vision, (Nov. 2000), 137-138.

Lewis, Sony and Visa in On-Line Entertainment Venture, New York Times, v145, Nov. 16, 1995.

McIver, R. et al., "Identification and Verification Working Together," Bioscrypt™, Aug. 27, 2004, [online] [Retrieved on Jan. 7, 2007] Retrieved from the Internet<URL:http://www.ibia.org/membersadmin/whitepapers/pdf/15/Identification%20and%20Verification%20Working%20Together.pdf>.

Nilsson, J. et al., "Match-On-Card for Java Cards," Precise Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20for%20Java%20Cards.pdf>.

Nordin, B., "Match-On-Card Technology," Precise™ Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20technology.pdf>.

Notification of the International Search Report and Written Opinion, PCT/US04/38124, Apr. 7, 2005, 10 pages.

Paget, Paul, "The Security Behind Secure Extranets," Enterprise Systems Journal, (Dec. 1999), 4 pgs.

(56) References Cited

OTHER PUBLICATIONS

PCT International Search Report and Written Opinion, PCT/US05/43447, Feb. 22, 2007, 7 pages.
PCT International Search Report and Written Opinion, PCT/US05/46843, Mar. 1, 2007, 10 pages.
Press Release, "Micronas and Thomson Multimedia Showcase a New Copy Protection System that Will Drive the Future of Digital Television," www.micronas.com Jan. 8, 2002.
Press Release, "Content Protection Plan Targets Wireless Home Networks," www.eetimes.com Jan. 11, 2002.
Press Release, "Thompson Bets on Smart Cards for Video Encryption," www.informationweek.com Jun. 7, 2001.
Press Release, "Thompson Multimedia Unveils Copy Protection Proposal Designed to Provide Additional Laye of Digital Content Security," www.thompson-multimedia.com, May 30, 2001.
"SAFModule™: A Look Into Strong Authentication," saflink Corporation, [online] [Retrieved on Jan. 7, 2007] Retrieved from the Internet<URL:http://www.ibia.org/membersadmin/whitepapers/pdf/6/SAFmod_WP.pdf>.
Sapsford, Jathon, "E-Business: Sound Waves Could Help Ease Web-Fraud Woes," Wall Street Journal, (Aug. 14, 2000), B1.
"Say Hello to Bluetooth," Bluetooth Web site, 4 pages.
"Smart Cards and Biometrics White Paper," Smart Card Alliance, May 2002, [online] [Retrieved on Jan. 7, 2007] Retrieved from the Internet<URL:http://www.securitymanagement.com/library/smartcard_faqtech0802.pdf>.
Van Winkle, William, "Bluetooth, the King of Connectivity," Laptop Buyer's Guide and Handbook, (Jan. 2000), 148-153.
Wade, W., "Using Fingerprints to Make Payments at POS Slowly Gaining Popularity," Credit Union Journal, International Biometric Group, Apr. 21, 2003, [online] [Retrieved on Jan. 7, 2007] Retrieved from the Internet<URL:http://www.biometricgroup.com/in_the_news/04.21.03.html>.
Wallace, Bob, "The Internet Unplugged," InformationWeek, 765(22), (Dec. 13, 1999), 22-24.
Weber, Thomas E., "In the Age of Napster, Protecting Copyright is a Digital Arms Race," Wall Street Journal, (Jul. 24, 2000), B1.
"IEEE 802.15.4-2006—Wikipedia, the free encyclopedia," Wikipedia®, Last Modified Mar. 21, 2009 [Online] [Retrieved on Apr. 30, 2009] Retrieved from the Internet<URL:http://en.wikipedia.org/wiki/IEEE_802.15.04-2006>.
Dagan (Power over Ethernet (PoE) Midspan—The Smart Path to Providing Power for IP Telephony Author: Sharon Dagan, Product Manager, Systems Aug. 2005, PowerDsine Inc.).
PCT International Search Report and Written Opinion, PCT/US07/11105, Oct. 20, 2008, 10 pages.
PCT International Search Report and Written Opinion, PCT/US07/11103, Apr. 23, 2008, 9 pages.
PCT International Search Report and Written Opinion, PCT/US07/00349, Mar. 19, 2008, 10 pages.
Beaufour, Allan et al., "Personal Servers as Digital Keys," Proceedings of the Second IEEE Annual Conference on Pervasive Computing and Communications (Percom'04), 2004, pp. 319-328.
Brown, Dan, "Techniques for Privacy and Authentication in Personal Communication Systems," Personal Communications, IEEE, 1995, pp. 6-10, vol. 2, Issue 4.
Nel, J.J. et al., "Generation of Keys for Use with the Digital Signature Standard (DSS)," Communications and Signal Processing, Proceedings of the 1993 IEEE South African Symposium, 1993, pp. 6-11.

* cited by examiner

CONFIGURATION OF INTERFACES FOR A LOCATION DETECTION SYSTEM AND APPLICATION

CROSS-REFERENCE TO RELATED APPLICATIONS

The present application claims the benefit of priority under 35 U.S.C. §119(e) of U.S. Provisional Application No. 60/865,596 entitled "TrueProx Touch Technology/Bally" filed on Nov. 13, 2006, the entire contents of which are incorporated by reference.

BACKGROUND

1. Field of Art

The invention generally relates to a wireless identification system, and more specifically, to a player tracking system using wireless identification technology.

2. Description of the Related Art

Casinos and hotels constantly seek to enhance overall customer experience in order to improve business. By tracking a customer's spending and playing trends a casino can better personalize service to the customer. Traditionally, casinos and hotels utilize physical tracking systems including credit cards, guest room cards and casino player cards. Utilizing these devices, a casino/hotel can gain valuable information about a player's habits and develop marketing promotions, advertisements and reward programs to enhance the customer's experience.

Typically, a customer can obtain a player tracking card by providing basic contact and preference information to the casino/hotel. This information is used to establish a customer account linked to the player tracking card. The customer can use the card to makes purchases with the casino/hotel or to play casino games. Often, customers accumulate points in the linked account based on their spending and/or wagering. These points can later be redeemed for items such as room upgrades, free dinners or free game play. In some systems, players can deposit electronic funds into an account or establish a line of credit linked to the player tracking card. The card can then act like a debit card or credit line to provide funds for purchases or gaming.

There are several important disadvantages to the traditional player tracking systems. First, conventional player tracking systems rely on plastic cards using magnetic strip technology. The magnetic strips can wear down over time requiring that they be replaced. Second, in order for the casino to track any information, the player must insert the card into an electronic gaming machine and remember to remove it when finished. At staffed gaming tables, conventional tracking systems require that a player give his/her tracking card to the gaming staff that then manually enter information into the computer system. This is enough of an inconvenience that some players are discouraged from using tracking cards at all.

Another problem is that the casino is unable to gain any useful information about the player when the card is not being used. For example, the casino has no way of knowing if a customer stopped to look at a game, but chose not to play it. Thus, the casino is unable to provide targeting marketing, promotions or announcements to customers that are not currently gaming. The casino may miss valuable opportunities to up sell an offer or entice a non-player to begin wagering. Furthermore, the casino is unable to provide personalized service to the customer (e.g., drink delivery, food service, valet service, etc.) while the customer is not currently logged in to the player tracking system.

Yet another problem with traditional systems is that the tracking cards typically cannot be used for purposes other than gaming. For example, a casino/hotel guest may be given a separate card that acts as a room key and uses his/her own personal debit cards, credit cards or Automated Teller Machine (ATM) cards for various transactions. This creates an inconvenience for the customer who must carry and manage multiple cards. In view of the deficiencies above, there is a need for an improved player tracking system that will allow casinos/hotels to provide improved customer service to its patrons.

SUMMARY

A system and method provides efficient and highly reliable customer and asset tracking. A portable, physical device, referred to herein as a Personal Digital Key (PDK) is carried by a customer or fixed to an asset. The PDK is adapted to wirelessly communicate with a receiver/decoder circuit (RDC). The RDC can be coupled to or integrated with a variety of electronic devices. The RDC wirelessly detects the PDK when the PDK enters a proximity zone of the RDC. A configuration module receives a PDK identification code identifying the PDK. The configuration module configures the operation of the electronic device based on the PDK identification code. In one embodiment, the operation of the electronic device is further configured based on an RDC identification code identifying the RDC.

In one embodiment, the configuration module determines PDK state information associated with the PDK identification and RDC state information associated with the RDC identification code. Based on the state information, the configuration module determines one or more available functions executable by the electronic device. The configuration module then configures either the electronic device, the PDK or both with a user interface based on the available functions. The configuration can also specify one more automated functions to be executed by the PDK, the electronic device or both.

In one embodiment, configuring the user interface comprises displaying a menu on a viewing screen showing a visual representation of the available functions. Soft keys on the viewing screen are assigned to menu options. Selection of a soft key causes the selected function to execute.

In one or more embodiment, the electronic device can comprise an electronic gaming machine, a hotel check in kiosk, a cashier kiosk, a location tracking processor, a display processor linked to a display or front end hardware to a server or network. Furthermore, the PDK can be carried by or fixed to a casino player, a hotel guest, an employee or an asset.

The features and advantages described in the specification are not all inclusive and in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
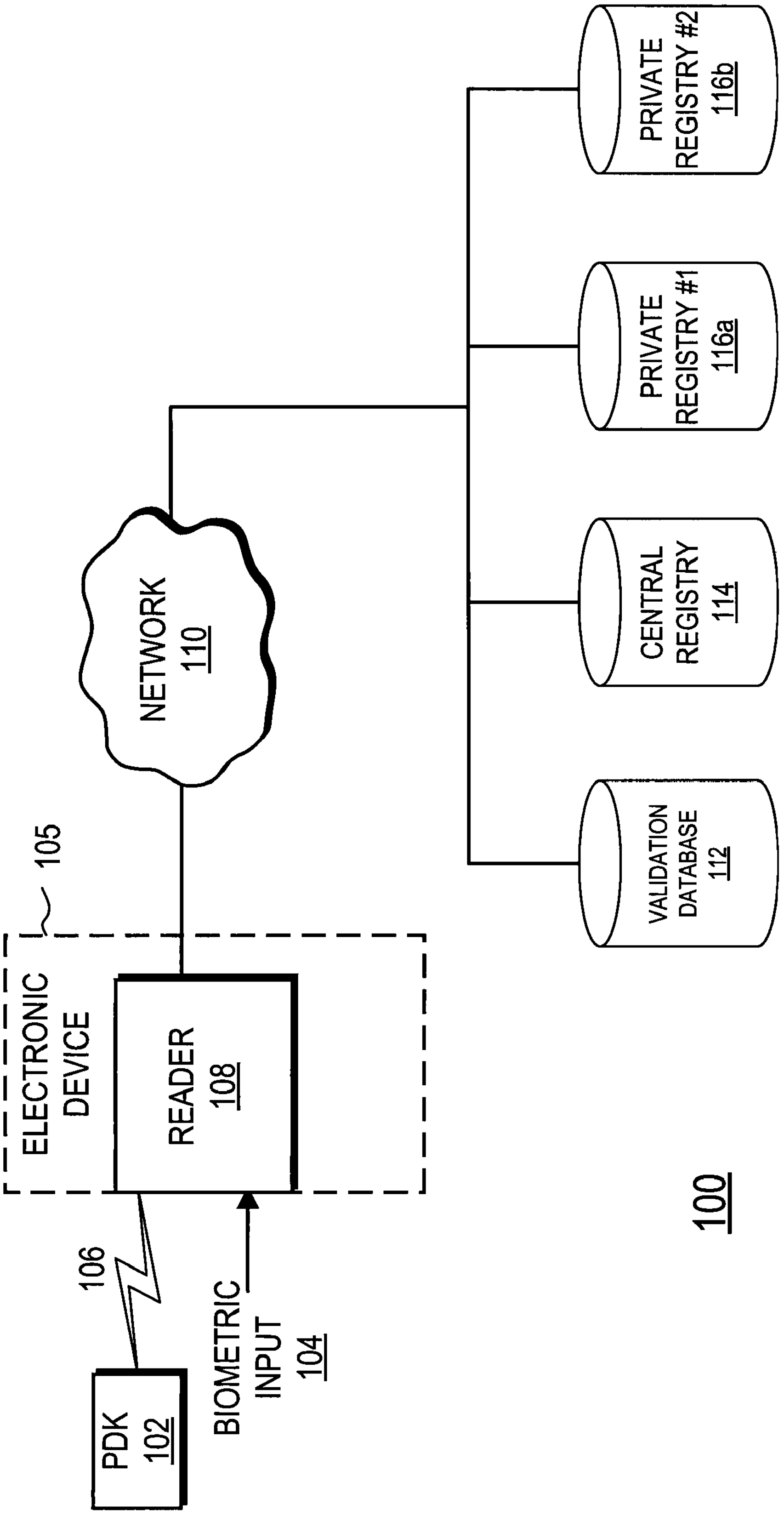
FIG. 1 is a high level block diagram illustrating a system for secure electronic authentication.

FIG. 1 is a high level block diagram illustrating a system for securely authenticating a personal digital key (PDK) 102 based upon proximity of the PDK 102 to a Reader 108. The system 100 comprises a PDK 102, a Reader 108, a network 110 and one or more external databases including a validation database 112, a Central Registry 114 and one or more private registries 116. The Reader 108 can be optionally embedded within or adapted to communicate (e.g., as a peripheral module to the device 105) with an existing electronic device 105. The Reader 108 is adapted to communicate with the PDK 102 by a wireless link 106 and is adapted to communicate with a network 110 by either a wired or wireless link. The Reader 108 is also optionally configured to receive a biometric input 104 from a user. The network 110 couples the validation database 112, the Central Registry 114 and the private registries 116 to the Reader 108. In alternative embodiments, different or additional external registries, databases or other devices may be coupled to the network 110. Furthermore, any number of electronic devices 105 and/or Readers 108 can be in communication with the network 110. In another embodiment, the Reader 108 operates as a standalone device without a connection to the network 110.

In one embodiment, the system 100 determines identity information associated with the PDK 102 and executes an authentication process. For example, the system 100 can determine if an individual is authorized for a transaction. The transaction could comprise, for example, executing a purchase or financial dealing, enabling access to physical and/or digital items, verifying identification or personal information or causing the electronic device 105 to execute one or more functions.

Generally, the Reader 108 wirelessly receives information stored in the PDK 102 that uniquely identifies the PDK 102 and the owner of the PDK 102. In one embodiment, the PDK "owner" is an individual carrying the PDK 102. In another embodiment, the owner may be a device or asset in which the PDK 102 is embedded or attached to. In some configurations, the Reader 108 is adapted to receive a biometric input 104 from an individual. Based on the received information, the Reader 108 initializes an authentication process for the PDK 102. Beneficially, the system 100 can provide comprehensive authentication without the need for PINs or passwords. Moreover, personal biometric information need not be stored in any local or remote storage database and is only stored on the user's own PDK 102. Furthermore, in one embodiment, purchase transactions can be efficiently completed without requiring the use of physical credit cards, tokens or other user action beyond initiating the transaction.

The credibility of the system 100 is ensured by the use of a PDK 102 that stores trusted information. The PDK 102 is a compact, portable uniquely identifiable wireless device typically carried by an individual or fixed to an asset. The PDK 102 stores digital information in a tamper-proof format that uniquely associates the PDK 102 with the individual or asset. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

To establish the trust, credibility and confidence of the authentication system, information stored in the PDK 102 is acquired by a process that is trusted, audited and easily verified. The process is ensured by a trusted third-party system, referred to herein as a Notary, that administers the acquisition and storage of information in the PDK 102 according to defined security protocols. In one embodiment, the Notary is a system and/or a trusted individual that witnesses the acquisition and storage either in person or remotely. In another embodiment, the Notary comprises trusted hardware that administers the initialization process by an automated system. Thus, once initialized by the trusted process, the PDK

102 can prove that the information it stores is that of the individual. Example embodiments of the initialization process are described in U.S. patent application Ser. No. 11/744,832 to John Giobbi, et al., entitled "Personal Digital Key Initialization and Registration For Secure Transaction" filed on May 5, 2007, the entire contents of which are incorporated herein by reference.

In one embodiment, the Reader 108 is integrated with an existing electronic device 105 to add proximity detection and authentication capabilities to the device 105. For example, in one embodiment, the electronic device 105 is a point of sale device for authorizing purchase transactions. In other embodiments, the electronic device 105 can be, for example, an electronic gaming machine, a self-service kiosk, a locking device, a display processor, front end hardware to a server or any other device modified to include a Reader 108. An example system including a Reader 108 adapted to operate with an electronic gaming system is described below with reference to FIG. 3B.

The Reader 108 wirelessly communicates with the PDK 102 when the PDK 102 is within a proximity zone of the Reader 108. The proximity zone can be, for example, several meters in radius and can be adjusted dynamically by the Reader 108. Thus, in contrast to many conventional RF ID devices, the Reader 108 can detect and communicate with the PDK 102 without requiring the owner to remove the PDK 102 from his/her pocket, wallet, purse, etc. Generally, the Reader 108 receives uniquely identifying information from the PDK 102 and initiates an authentication process. In one embodiment, the Reader 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The Reader 108 compares the biometric input 104 to information received from the PDK 102 to determine if a transaction should be authorized. Alternatively, the biometric input 104 can be obtained by a biometric reader on the PDK 102 and transmitted to the Reader 108 for authentication. In additional alternative embodiment, some or all of the authentication process can be performed by the PDK 102 instead of the Reader 108.

The Reader 108 is further communicatively coupled to the network 110 in order to receive and/or transmit information to remote databases for remote authentication. In an alternative embodiment, the Reader 108 includes a non-volatile data storage that can be synchronized with one or more remote databases 112 or registries 114-116. Such an embodiment alleviates the need for a continuous connection to the network 110 and allows the Reader 108 to operate in a standalone mode and for the local data storage to be updated when a connection is available. For example, a standalone Reader 108 can periodically download updated registry entries and perform authentication locally without any remote lookup.

The network 110 provides communication between the Reader 108 and the validation database 112, Central Registry 114 and one or more private registries 116. In alternative embodiments, one or more of these connections may not be present or different or additional network connections may be present. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The validation database 112 stores additional information that may be used for authorizing a transaction to be processed by the Reader 108. For example, in purchase transactions, the validation database 112 is a credit card validation database that is separate from the merchant providing the sale. Alternatively, a different database may be used to validate different types of purchasing means such as a debit card, ATM card or bank account number.

The registries 114-116 are securely-accessible databases coupled to the network 110 that store, among other items, PDK, Notary and Reader information. In one embodiment, the registries 114-116 do not store biometric information. In an alternative embodiment, a registry stores biometric information in an encoded format that can only be recovered using an algorithm or encoding key stored in the PDK 102. Information stored in the registries can be accessed by the Reader 108 via the network 110 for use in the authentication process. There are two basic types of registries illustrated: private registries 116 and the Central Registry 114. Private registries 116 are generally established and administered by their controlling entities (e.g., a merchant, business authority or other entity administering authentication). Private registries 116 can be custom configured to meet the specialized and independent needs of each controlling entity. The Central Registry 114 is a single highly-secured, centrally-located database administered by a trusted third-party organization. In one embodiment, all PDKs 102 are registered with the Central Registry 114 and may be optionally registered with one or more selected private registries 116. In alternative embodiments, a different number or different types of registries may be coupled to the network 110.

Figure 2A:
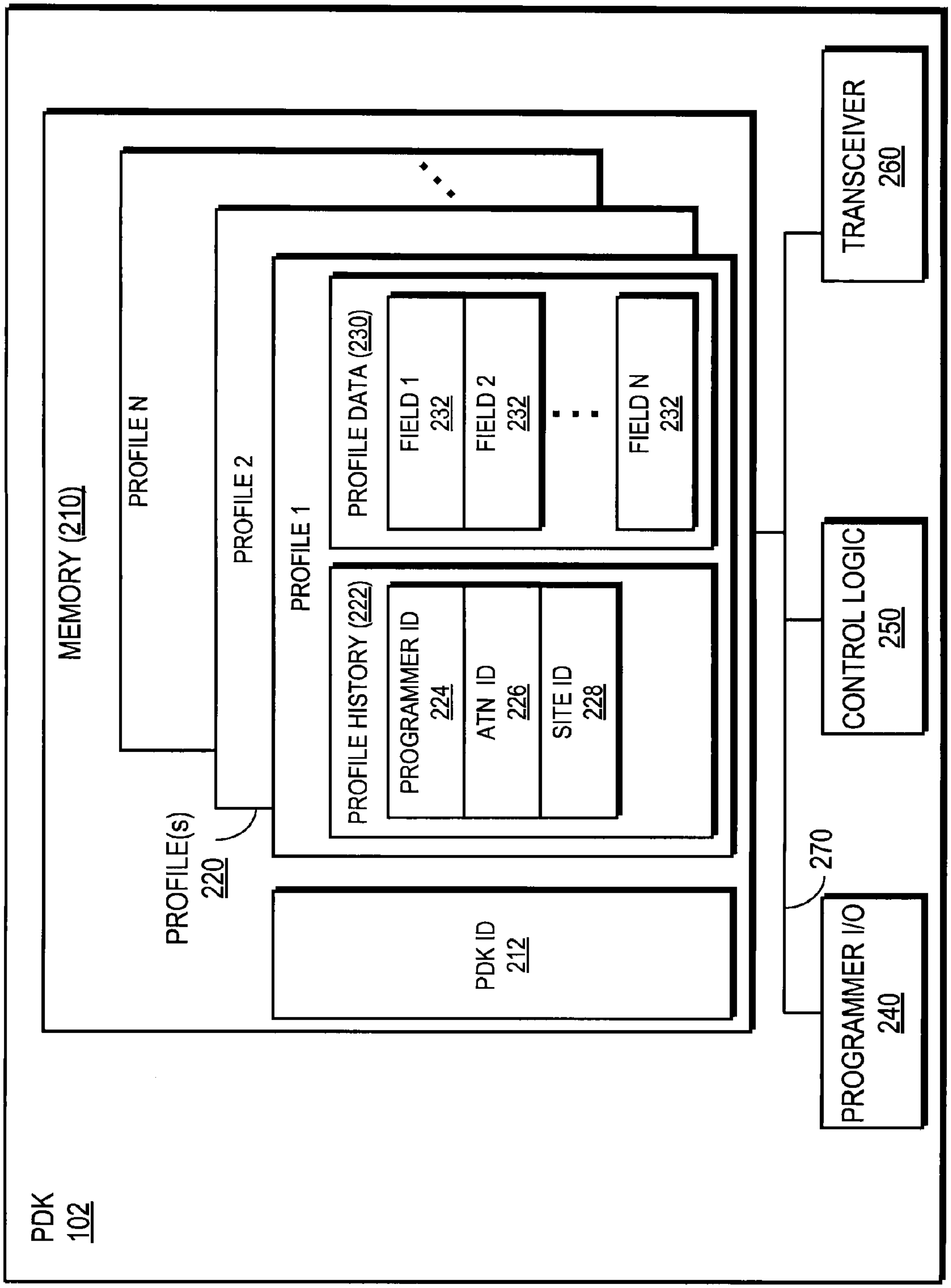
FIG. 2A is a block diagram illustrating one embodiment of a Personal Digital Key (PDK).

Turning now to FIG. 2A, an example embodiment of a PDK 102 is illustrated. The PDK 102 comprises a memory 210, a programmer I/O 240, control logic 250 and a transceiver 260, coupled by a bus 270. The PDK 102 can be standalone as a portable, physical device or can be integrated into commonly carried items. For example, a PDK 102 can be integrated into a portable electronic device such as a cell phone, Personal Digital Assistant (PDA) or GPS unit, an employee identification tag, clothing or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain or in a wallet. In some embodiments, the PDK 102 can be combined or integrated with existing identification technology such as, for example, ID badges (or functionally similar devices), physical photograph(s), barcode encoded technology, magnetic strip technology, smartcard technology, data RFID technology or technologies utilizing uniquely identifiable graphical, textual or biometric information.

The memory 210 can be a read-only memory, a once-programmable memory, a read/write memory or any combination of memory types including physical access secured and tamperproof memories. The memory 210 typically stores a unique PDK ID 212 and one or more profiles 220. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private 116 or Central 114 registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The profile fields 220 can be initially empty at the time of manufacture but can be written to by authorized individuals (e.g., a Notary) and/or hardware (e.g., a Programmer). In one embodiment, each profile 220 comprises a profile history 222 and profile data 230. Many different types of profiles 220 are possible. A biometric profile, for example, includes profile data 230 representing physical and/or behavioral information that can uniquely identify the PDK owner. A PDK 102 can store multiple biometric profiles, each comprising a different type of biometric information. In one embodiment, the biometric profile 220 comprises biometric information transformed by a mathematical operation, algorithm, or hash that represents the complete biometric information (e.g., a complete fingerprint scan). In one embodiment, a mathematical hash is a "one-way" operation such that there is no practical way to re-compute or recover the complete biometric information from the biometric profile. This both reduces the amount of data to be stored and adds an additional layer of protection to the user's personal biometric information. In one embodiment, the biometric profile is further encoded using an encoding key and/or algorithm that is stored with the biometric profile data. Then, for authentication, both the biometric profile data and the encoding key and/or algorithm are passed to the Reader 108.

In one embodiment the PDK 102 also stores one or more biometric profile "samples" associated with each biometric profile. The biometric profile sample is a subset of the complete profile that can be used for quick comparisons of biometric data. In one embodiment, the profile samples can be transmitted over a public communication channel or transmitted with reduced level of encryption while the full biometric profiles are only transmitted over secure channels. In the case of fingerprint authentication, for example, the biometric profile sample may represent only small portion area of the full fingerprint image. In another embodiment, the fingerprint profile sample is data that describes an arc of one or more lines of the fingerprint. In yet another embodiment, the fingerprint profile sample can be data representing color information of the fingerprint.

In another embodiment, the stored profiles 220 include a PIN profile that stores one or more PINs or passwords associated with the PDK owner. Here, the number or password stored in the PIN profile can be compared against an input provided by the user at the point of transaction to authenticate the user. In one embodiment, a PIN profile sample is also stored with the PIN profile that comprises a subset of the full PIN. For example, a PIN profile sample can be only the first two numbers of the PIN that can be used to quickly compare the stored PIN profile to a PIN obtained at the point of transaction.

In yet another embodiment, the PDK 102 stores a picture profile that includes one or more pictures of the PDK owner. In a picture profile authentication, the picture stored in the PDK 102 is transmitted to a display at the point of transaction to allow an administrator (e.g., a clerk or security guard) to confirm or reject the identity of the individual requesting the transaction. In another embodiment, an image is captured of the individual at the point of transaction and compared to the picture profile by an automated image analysis means. Furthermore, picture profiles could be used, for example, in place of conventional passports or drivers licenses to authenticate the identity of an individual and allow for remote identification of individuals. For example, a police officer following a vehicle could obtain an image and identity of the driver while still maintaining a safe distance from the vehicle. In the hospitality industry, a host could greet a guest at the door of a hotel, casino or restaurant and easily recognize the guest by obtaining the guest's picture profile as he/she enters.

A registry or database profile typically stores information associating the user with a registry. The registry profile can be used to determine if the individual is associated with the controlling entity for that registry and if different types of transactions are authorized for the individual. A registry profile can further include additional user information for use with the registry. For example, a private registry profile associated with a particular merchant may include a credit card number that the user has selected as a default for that merchant. In one embodiment, a profile can further include spending limits that limits the amount of purchases a user can make with a particular vendor or using a particular profile.

A profile can further include personal identification information such as name, address, phone number, etc., bank information, credit/debit card information or membership information. This information can be useful for certain types of transactions. For example, with purchases that require delivery, a PDK 102 can automatically transmit address information to the Reader 108 at the point of transaction. In one embodiment, a profile can store multiple addresses. At the point of transaction, the Reader 108 displays the address options and allows the user to select which address to use.

Generally, some types of profile information (e.g., a biometric profile) can only be acquired during a trusted initialization process that is administered by a trusted Notary. In one embodiment, other secure information such as credit card information are also stored to the PDK in the presence of a Notary. Alternatively, certain types of low-risk information can be added by the user without a Notary, such as, for example a change of address. In another embodiment, once an initial profile has been stored to the PDK 102, a user can add information to the PDK 102 using a Programmer without a Notary through self-authentication. For example, in one embodiment, a PDK 102 that has a stored biometric profile can be "unlocked" by providing a matching biometric input. Then, once unlocked, the user can add or remove additional profiles, credit cards, personal information, etc. to the PDK 102 using a Programmer. For example, in one embodiment, a user that has unlocked his/her own PDK 102 can store additional biometric information (such as fingerprint information for other fingers) in his/her PDK 102. In another example, a user that cancels a credit card, can unlock his/her PDK 102 to remove the credit card information. In another embodiment, the user can make copies of the PDK 102 or move profiles from one PDK 102 to another once the PDK 102 is unlocked.

The profile history 222 includes a programmer ID field 224, a Notary ID 226 and a site ID field 228. The profile history 222 relates to the specific hardware, Notary and site used at the time the profile data was created and stored to the PDK. Typically each profile 220 stores its specific profile history 222 along with the profile data 230. The profile history

222 can be recalled for auditing purposes at a later time to ensure the credibility of the stored data. In one embodiment, transaction history can also be stored to the PDK memory 210. Here, the PDK 102 stores information associated with any transactions made with the PDK 102 such as the name of the merchant, the purchase amount, credit card used, etc.

The PDK 102 also includes a programmer I/O 240 that provides an interface to a trusted Programmer (not shown). The Programmer comprises trusted hardware that is used to program the memory 210 of the PDK 102. An example embodiment of a Programmer is described in U.S. patent application Ser. No. 11/744,832 to John Giobbi, et al., entitled "Personal Digital Key Initialization and Registration For Secure Transaction" filed on May 5, 2007, the entire contents of which are incorporated herein by reference. The programmer I/O 240 can be, for example, a USB interface, serial interface, parallel interface or any other direct or wireless link for transferring information between the PDK 102 and the Programmer. When coupled to the Programmer, the programmer I/O 240 receives initialization data, registration data or other information to be stored in the memory 210.

The control logic 250 coordinates between functions of the PDK 102. In one embodiment, the control logic 250 facilitates the flow of information between the programmer I/O 240, transceiver 260 and memory 210. The control logic 250 can further process data received from the memories 210, programmer I/O 240 and transceiver 260. Note that the control logic 250 is merely a grouping of control functions in a central architecture, and in other embodiments, the control functions can be distributed between the different modules of the PDK 102. The operation of the control logic will be understood to those skilled in the art based on the description below corresponding to FIGS. 4-7D.

The transceiver 260 is a wireless transmitter and receiver for wirelessly communicating with a Reader 108 or other wireless device. The transceiver 260 can send and receive data as modulated electromagnetic signals. Moreover, the data can be encrypted by the transceiver 260 and transmitted over a secure link. Further, the transceiver 260 can actively send connection requests, or can passively detect connection requests from another wireless source. In one embodiment, the transceiver 260 is used in place of a separate programmer I/O 240 and is used to wirelessly communicate with the Programmer for programming. In one embodiment, the transceiver 260 is adapted to communicate over a range of up to around 5 meters.

Optionally, a PDK 102 can also include a built in biometric reader (not shown) to acquire a biometric input from the user. The biometric input can be used to unlock the PDK 102 for profile updates or for various types of authentication. For example, in one embodiment, a biometric input is received by the PDK 102 and compared to stored biometric information. Then, if the user is authenticated, the PDK 102 can indicate to the Reader 108 that the user is authenticated and transmit additional information (e.g., a credit card number) needed to complete a transaction.

Figure 2B:
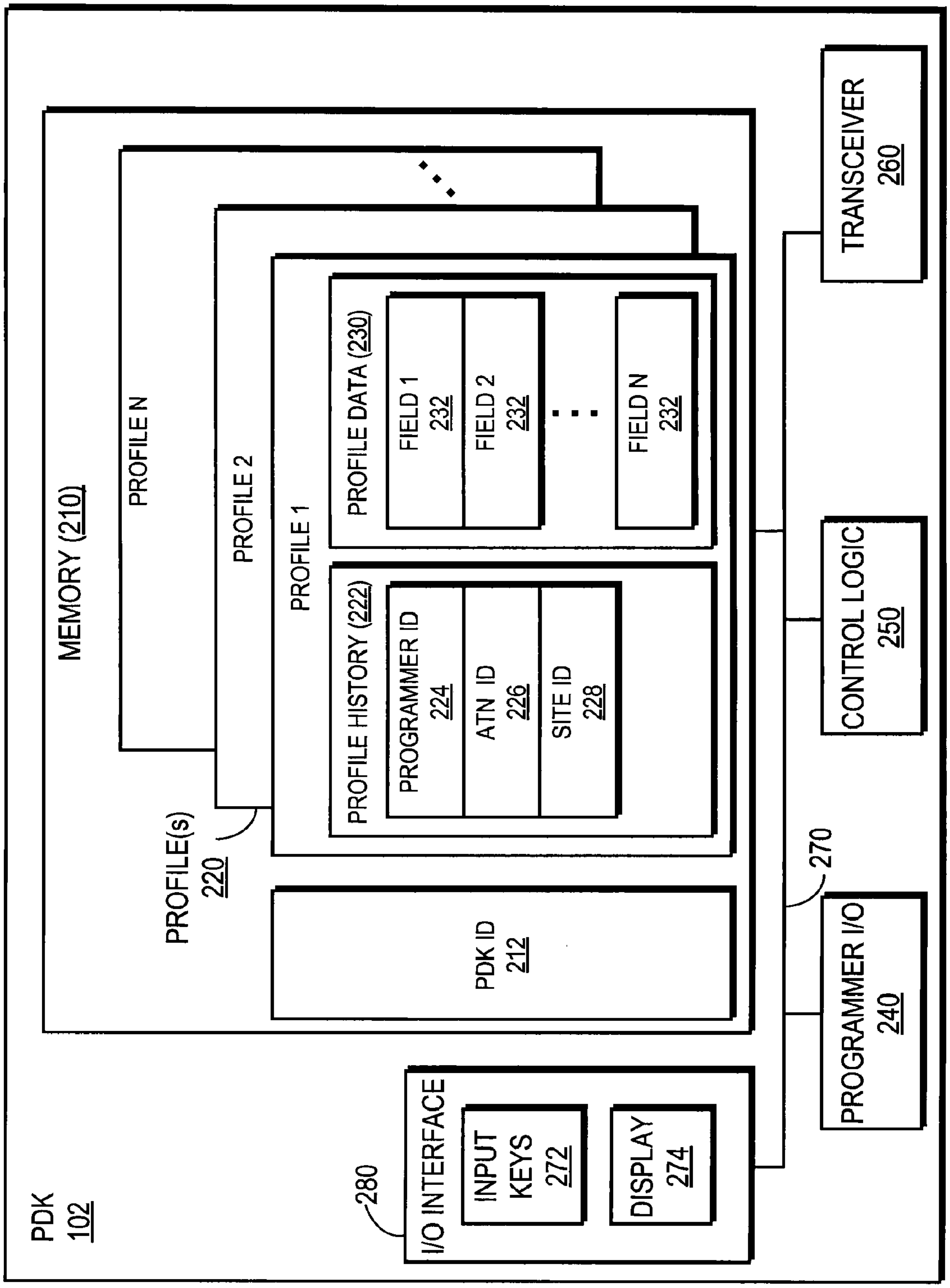
FIG. 2B is a block diagram illustrating another embodiment of a Personal Digital Key (PDK).

FIG. 2B illustrates an alternative embodiment of a PDK 102. This embodiment is similar to that illustrated in FIG. 2A but also includes an I/O interface 280. The I/O interface 280 includes a display 274 and input keys 272. The display 274 can be, for example, an organic light emitting diode display (OLED), a liquid crystal display (LCD) or one or more light emitting diodes (LEDs). In one embodiment, one or more of the input keys 272 are "soft" keys. The functions associated with soft keys can change dynamically depending on the particular use of the PDK 102.

Figure 3A:
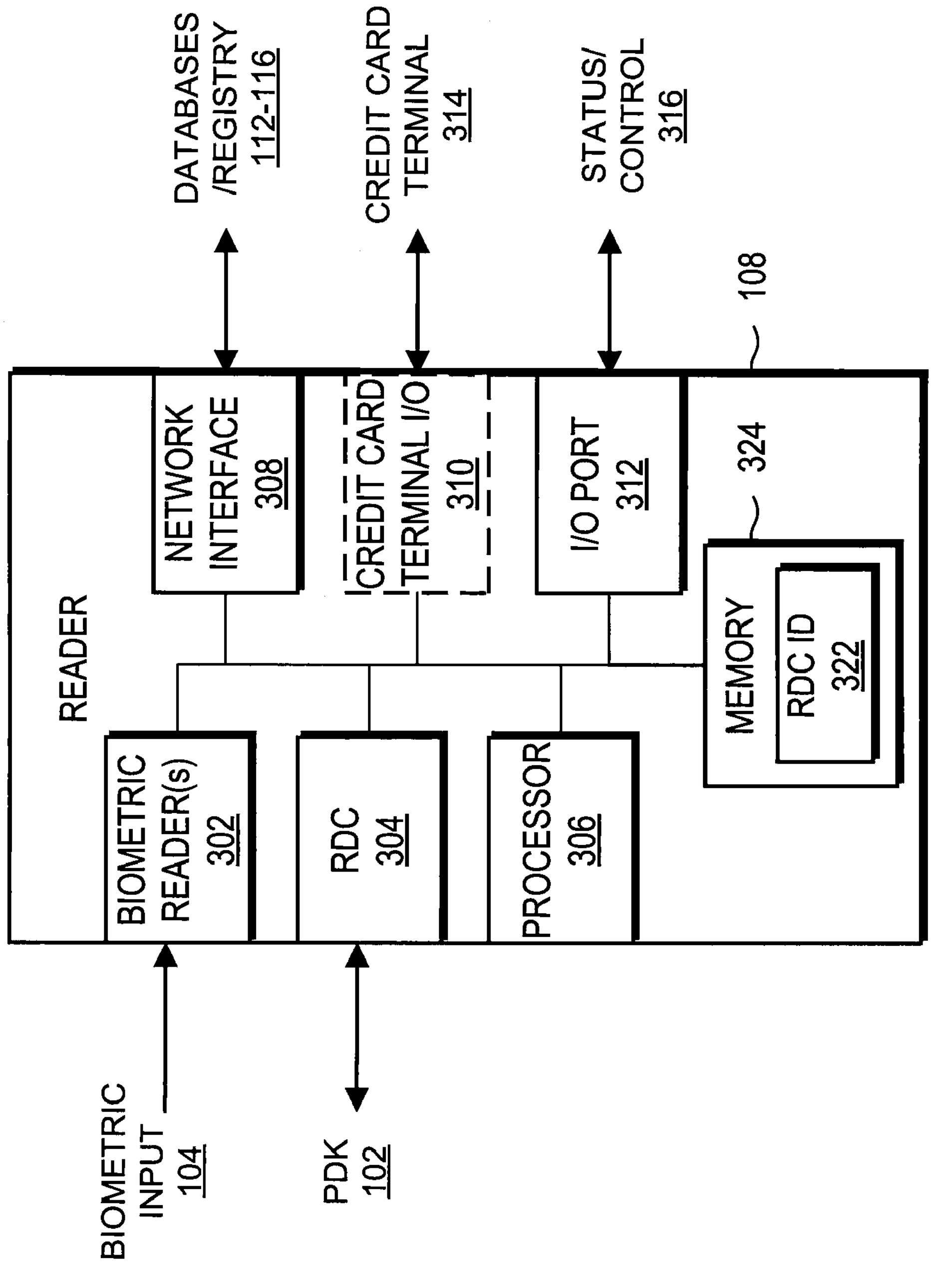
FIG. 3A is a block diagram illustrating one embodiment of a Reader.

Turning now to FIG. 3, an example embodiment of a Reader 108 is illustrated. The embodiment includes a receiver-decoder circuit (RDC) 304, a processor 306, a network interface 308, an I/O port 312, a memory 324 and optionally one or more biometric readers 302. In alternative embodiments, different or additional modules can be included in the Reader 108. For example, if the Reader 108 is integrated with an electronic device 105 already providing one or more of the illustrated modules, the Reader 108 may instead be adapted to communicate with the existing modules. For example, if the Reader 108 is integrated with an electronic gaming machine having a network interface, an embodiment of the Reader 108 may be used that does not include a separate network interface 308. Similarly, alternative embodiments of the Reader 108 may be adapted to use processing and/or memory resources of the electronic device 105.

The RDC 304 provides the two-way wireless interface between the Reader 108 and the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method", the entire contents of which are incorporated herein by reference. Encrypting data transmitted between the PDK 102 and Reader 108 minimizes the possibility of eavesdropping or other fraudulent activity. In one embodiment, the RDC 304 is also configured to transmit and receive certain types of information in an unencrypted or public, format.

In some configurations a biometric reader 302 receives and processes biometric input 104 from an individual at the point of transaction. In one embodiment, the biometric reader 302 is a fingerprint scanner. Here, the biometric reader 302 includes an image capture device adapted to capture the unique pattern of ridges and valleys in a fingerprint also known as minutiae. Other embodiments of biometric readers 302 include retinal scanners, iris scanners, facial scanner, palm scanners, DNA/RNA analyzers, signature analyzers, cameras, microphones and voice analyzers. Furthermore, the Reader 108 can include multiple biometric readers 302 of different types. In one embodiment, the biometric reader 302 automatically computes mathematical representations or hashes of the scanned data that can be compared to the mathematically processed biometric profile information stored in the PDK 102.

The memory 324 can be a read-only memory, a once-programmable memory, a read/write memory or any combination of memory types. The memory stores an RDC ID 322 that uniquely identifies the RDC 304. The RDC ID 322 can be used to distinguish a particular RDC 304 from other RDCs coupled to the network 110.

The processor 306 can be any general-purpose processor for implementing a number of processing tasks. Generally, the processor 306 processes data received by the Reader 108 or data to be transmitted by the Reader 108. For example, a biometric input 104 received by the biometric reader 302 can be processed and compared to the biometric profile 220 received from the PDK 102 in order to determine if a transaction should be authorized. In different embodiments, processing tasks can be performed within each individual module or can be distributed between local processors and a central processor. The processor 306 further includes a working memory for use in various processes such as performing the method of FIGS. 4-7D.

The network interface 308 is a wired or wireless communication link between the Reader 108 and one or more external databases such as, for example, a validation database 112, the Central Registry 114 or a private registry 116. For example, in one type of authentication, information is received from the PDK 102 at the RDC 304, processed by the processor 306 and transmitted to an external database 112-116 through the network interface 308. The network interface 308 can also receive data sent through the network 110 for local processing by the Reader 108. In one embodiment, the network interface 308 provides a connection to a remote system administrator to configure the Reader 108 according to various control settings.

The I/O port 312 provides a general input and output interface to the Reader 108. The I/O port 312 may be coupled to any variety of input devices to receive inputs such as a numerical or alphabetic input from a keypad, control settings, menu selections, confirmations and so on. Outputs can include, for example, status LEDs, an LCD or other display that provides instructions, menus or control options to a user.

The credit card terminal I/O 310 optionally provides an interface to an existing credit card terminal 314. In embodiments including the credit card terminal I/O 310, the Reader 108 supplements existing hardware and acts in conjunction with a conventional credit card terminal 314. In an alternative embodiment, the functions of an external credit card terminal 314 are instead built into the Reader 108. Here, a Reader 108 can completely replace an existing credit card terminal 314.

Figure 3B:
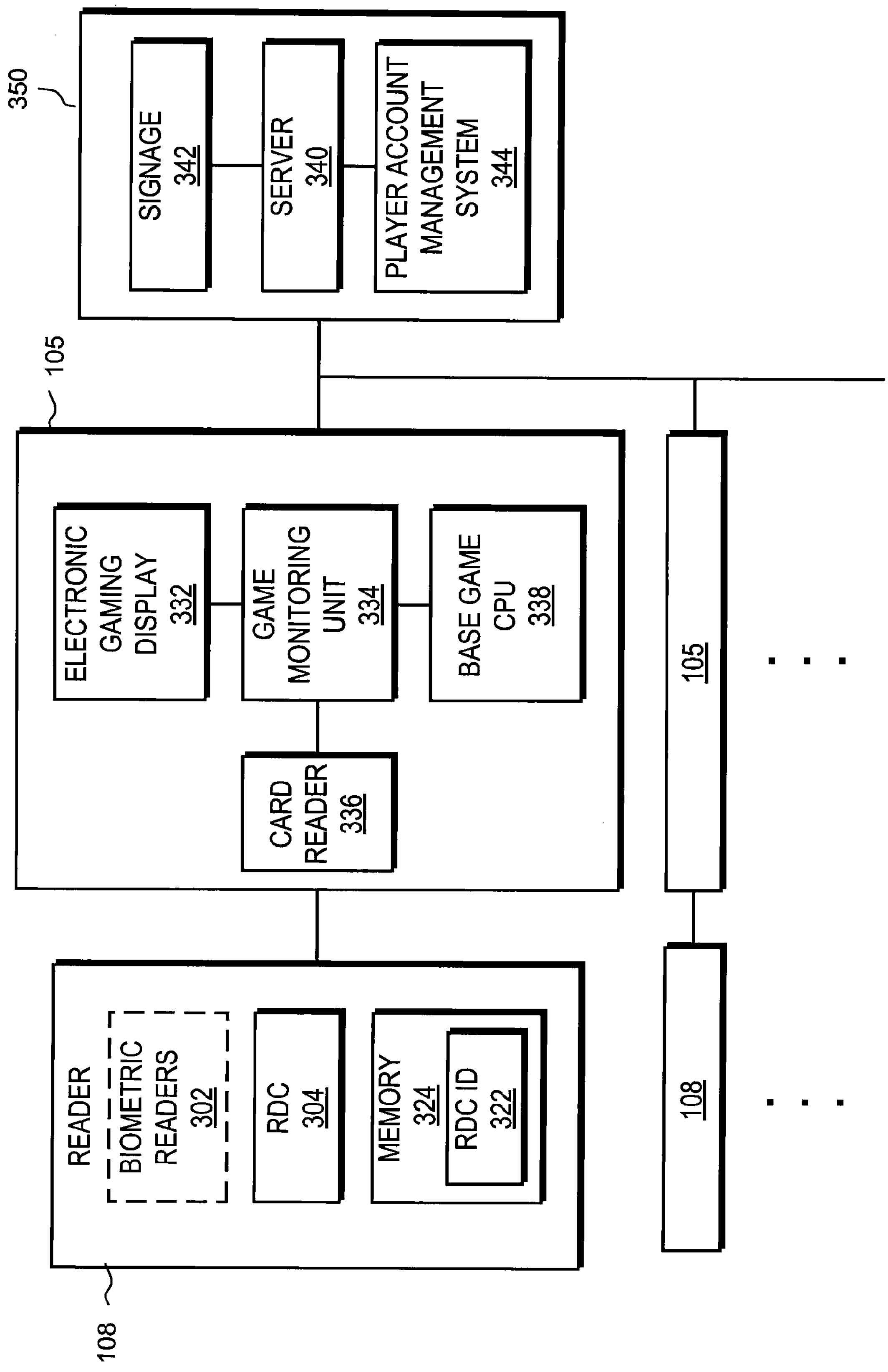
FIG. 3B is a block diagram illustrating another embodiment of a Reader for providing wireless player tracking to an electronic gaming environment.

FIG. 3B illustrates another embodiment of a Reader 108 for use with an electronic gaming machine 105. In this embodiment, the Reader 108 comprises an RDC 304, a memory 324 storing the RDC ID 322 and optionally a biometric reader 302. The Reader 108 adds components to an existing electronic gaming machine 105 to enable wireless capabilities and allows interaction between the electronic gaming machine 105 and a PDK 102. In one embodiment, the system comprises multiple electronic gaming systems 105 with Readers 108 coupled to a backend gaming system 350.

The electronic gaming machine 105 may be, for example, a slot machine, a video poker machine, video roulette, a keno machine, a video blackjack machine or any other casino gaming device. The electronic gaming system 105 includes an electronic gaming display 332, a game monitoring unit 334, a base game CPU 338 and a card reader 336. The electronic gaming display 332 can be, for example, an LCD, CRT or touch screen display that shows a graphical user interface for facilitating game play or providing player options. The base game CPU 338 executes gaming functions and performs processing to facilitate game play. The card reader 336 provides an interface for legacy player tracking cards and/or credit/debit cards. In one embodiment, the card reader 336 can be entirely replaced by the Reader 108. The game monitoring unit 334 facilitates player tracking functions and coordinates between the base game CPU 338, the card reader 336, the electronic gaming display and the Reader 108.

Any number of gaming machines 105 can communicate with a backend gaming system 350 comprising a server 340, a player account management system 344 and signage 342. The server 340 coordinates the flow of data between the gaming machines 105, the player account management system 344 and signage 342. The player account management system 344 manages player tracking features. The management system 344 can include databases and/or management software/hardware to track and manage player accounts, preferences, ratings, spending habits, etc. The server 340 can also control signage 342 throughout the property to display announcements, promotional offers or target advertisements based on player information received by the server 340.

In one embodiment, a Reader 108 is adapted to detect and prevent fraudulent use of PDKs that are lost, stolen, revoked, expired or otherwise invalid. For example, the Reader 108 can download lists of invalid PDKs IDs 212 from a remote database and block these PDKs 102 from use with the Reader 108. Furthermore, in one embodiment, the Reader 108 can update the blocked list and/or send updates to remote registries 114-116 or remote Readers 108 upon detecting a fraudulently used PDK 102. For example, if a biometric input 104 is received by the Reader 108 that does not match the biometric profile received from the PDK 102, the Reader 108 can obtain the PDK ID 212 and add it to a list of blocked PDK IDs 212. In another embodiment, upon detecting fraudulent use, the Reader 108 can send a signal to the PDK 102 that instructs the PDK 102 to deactivate itself. The deactivation period can be, for example, a fixed period of time, or until the rightful owner requests re-activation of the PDK 102. In yet another embodiment, the Reader 108 can send a signal instructing the fraudulently obtained PDK 102 to send alarm signals indicating that the PDK 102 a stolen device. Here, a stolen PDK 102 can be tracked, located and recovered by monitoring the alarm signals. In one embodiment, the Reader 108 stores biometric or other identifying information from an individual that attempts to fraudulently use a PDK 102 so that the individual's identity can be determined.

Generally, the Reader 108 is configured to implement at least one type of authentication. In many cases, multiple layers of authentication are used. A first layer of authentication, referred to herein as "device authentication", begins any time a PDK 102 moves within range of a Reader 108. In device authentication, the Reader 108 and the PDK 102 each ensure that the other is valid based on the device characteristics, independent of any profiles stored in the PDK 102. In some configurations, when fast and simple authentication is desirable, only device authentication is implemented. For example, a Reader 108 may be configured to use only device authentication for low cost purchase transactions under a predefined amount (e.g., $25). The configuration is also useful in other types of low risk operations where speed is preferred over additional layers of authentication.

Other configurations of the Reader 108 require one or more additional layers of authentication, referred to herein as "profile authentication" based on one or more profiles stored in the PDK 102. Profile authentication can include, for example, a biometric authentication, a PIN authentication, a photo authentication, a registry authentication, etc. or any combination of the above authentication types. Profile authentications are useful when a more exhaustive authentication process is desired, for example, for high purchase transactions or for enabling access to classified assets.

Figure 4:
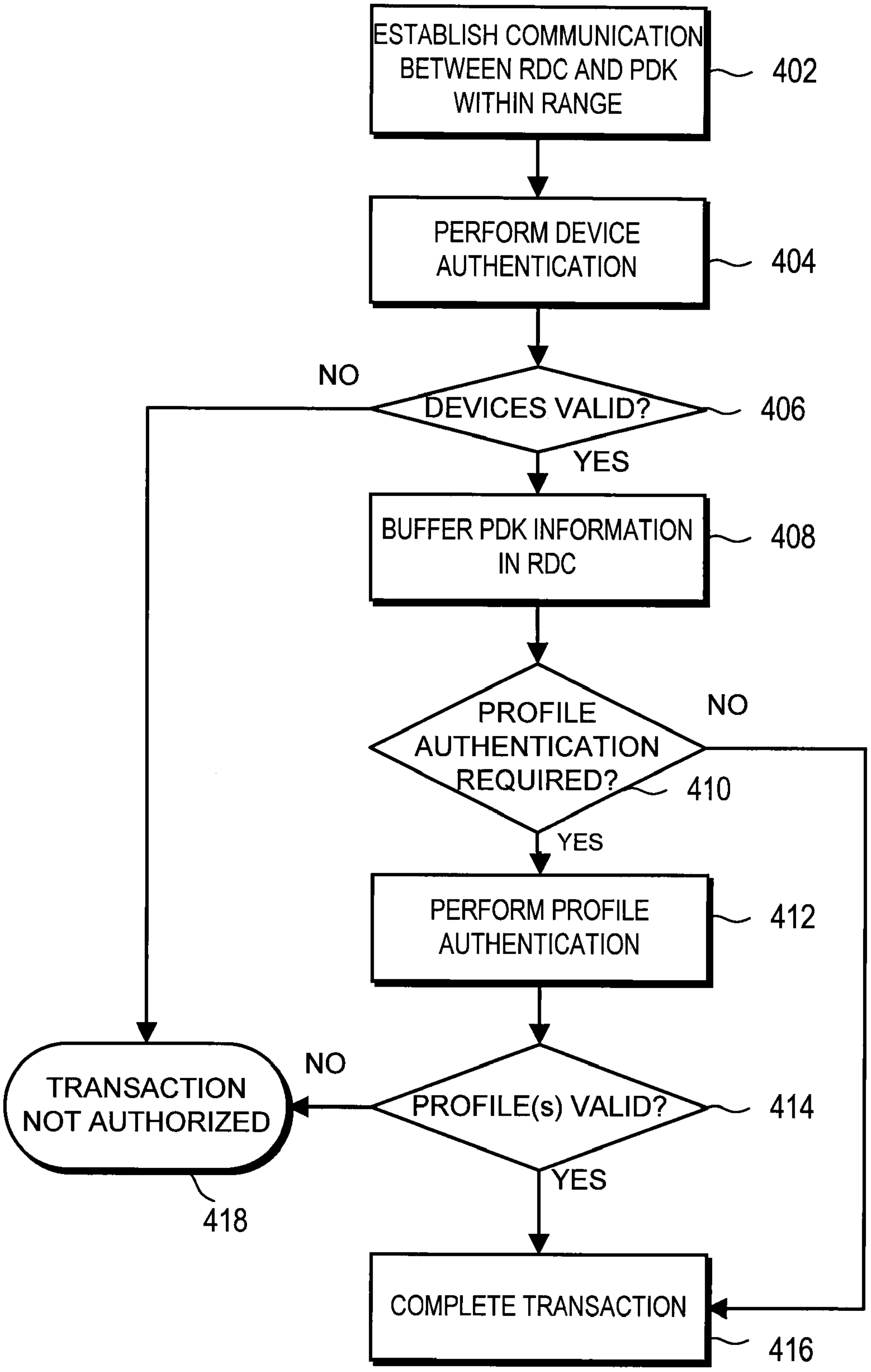
FIG. 4 is a flowchart illustrating one embodiment of a process for secure authentication.

FIG. 4 illustrates an example embodiment of a process for secure authentication of a PDK 102. When a PDK 102 comes within range of a Reader 108, communication is automatically established 402 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 404, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108.

Figure 5:
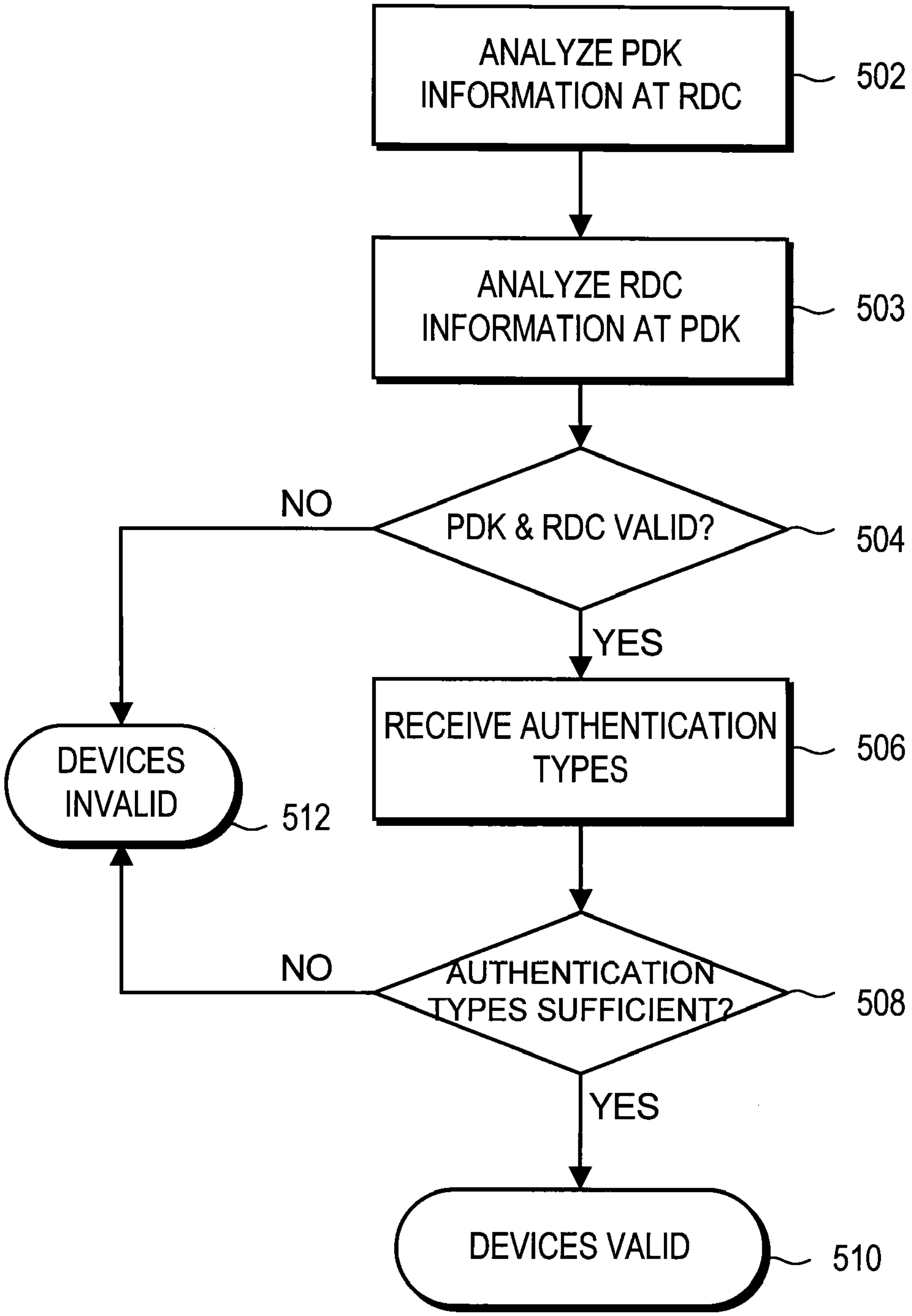
FIG. 5 is a flowchart illustrating one embodiment of a process for device authentication by a Reader.

An example embodiment of a method for performing 404 device authentication is illustrated in FIG. 5. The RDC 304 receives and analyzes 502 information from the PDK 102; and the PDK 102 receives and analyzes 502 information received from the RDC 304. Generally, this initial information is transmitted over a public communication channel in an unencrypted format. Based on the received information, each device 102, 304 determines 504 if the other is valid. As will be apparent to one of ordinary skill in the art, a number of different protocols can be used for this type of authentication such as, for example, a challenge-response authentication or a challenge handshake authentication protocol (CHAP). If either of the devices 102, 304 is invalid 512, the process ends. If both the PDK 102 and the RDC 304 are determined by the other to be valid, the Reader 108 requests and receives 506 authentication type information from the PDK 102 indicating the different types of authentication the PDK 102 is capable of satisfying based on the types of profiles the PDK 102 stores. The available profile types in the PDK 102 are compared against the authentication types that can be used by the Reader 108. For example, a particular Reader 108 may be configured to perform only a fingerprint authentication and therefore any PDK without a fingerprint biometric profile cannot be used with the Reader 108. In one embodiment, the Reader 108 can allow more than one type of profile to be used. In another embodiment, the Reader 108 requires more than one type of profile for authentication, while in yet further embodiments no profile authentications are required. Next, the method determines 508 whether the PDK 102 has one or more profiles sufficient for authentication. If the PDK 102 does not have one or more profiles sufficient for authentication with the Reader 108, the devices 102, 304 are determined to be invalid 512 because they cannot be used with each other. If the PDK 102 does have one or more sufficient types of profiles, the devices are valid 510.

Turning back to FIG. 4, if either the PDK 102 or RDC 304 is not found valid during device authentication 404, the transaction is not authorized 418 and the process ends. If the devices are valid, the RDC 304 temporarily buffers 408 the received PDK information. It is noted that in one embodiment, steps 402-408 are automatically initiated each time a PDK 102 enters the proximity zone of the Reader 108. Thus, if multiple PDKs 102 enter the proximity zone, the Reader 108 automatically determines which PDKs 102 are valid and buffers the received information from each valid PDK 102.

The method next determines 410 whether profile authentication is required based on the configuration of the Reader 108, the type of transaction desired or by request of a merchant or other administrator. If the Reader 108 configuration does not require a profile authentication in addition to the PDK authentication, then the Reader 108 proceeds to complete the transaction for the PDK 102. If the Reader 108 does require profile authentication, the profile authentication is performed 412 as will be described below with references to FIGS. 6-7D. If a required profile is determined 414 to be valid, the Reader 108 completes 416 the transaction. Otherwise, the Reader 108 indicates that the transaction is not authorized 418. In one embodiment, completing 416 the transaction includes enabling access to secure physical or digital assets (e.g., unlocking a door, opening a vault, providing access to a secured hard drive, etc.). In another embodiment, completing 416 the transaction includes configuring the electronic device 105 to perform a set of functions. In another embodiment, completing 416 the transaction includes charging a credit card for a purchase. In alternative purchase transactions, bank information, debit/check/ATM card information, coupon codes or any other purchasing means information (typically stored in a profile memory field 232) can be transmitted by the PDK 102 in place of credit card information. In one embodiment, the PDK 102 is configured with multiple purchasing means and a default is configured for different types of transactions. In another embodiment, each credit card or other purchasing means is displayed to the customer by the Reader 108 and the customer is allowed to select which to use for the transaction.

Figure 6:
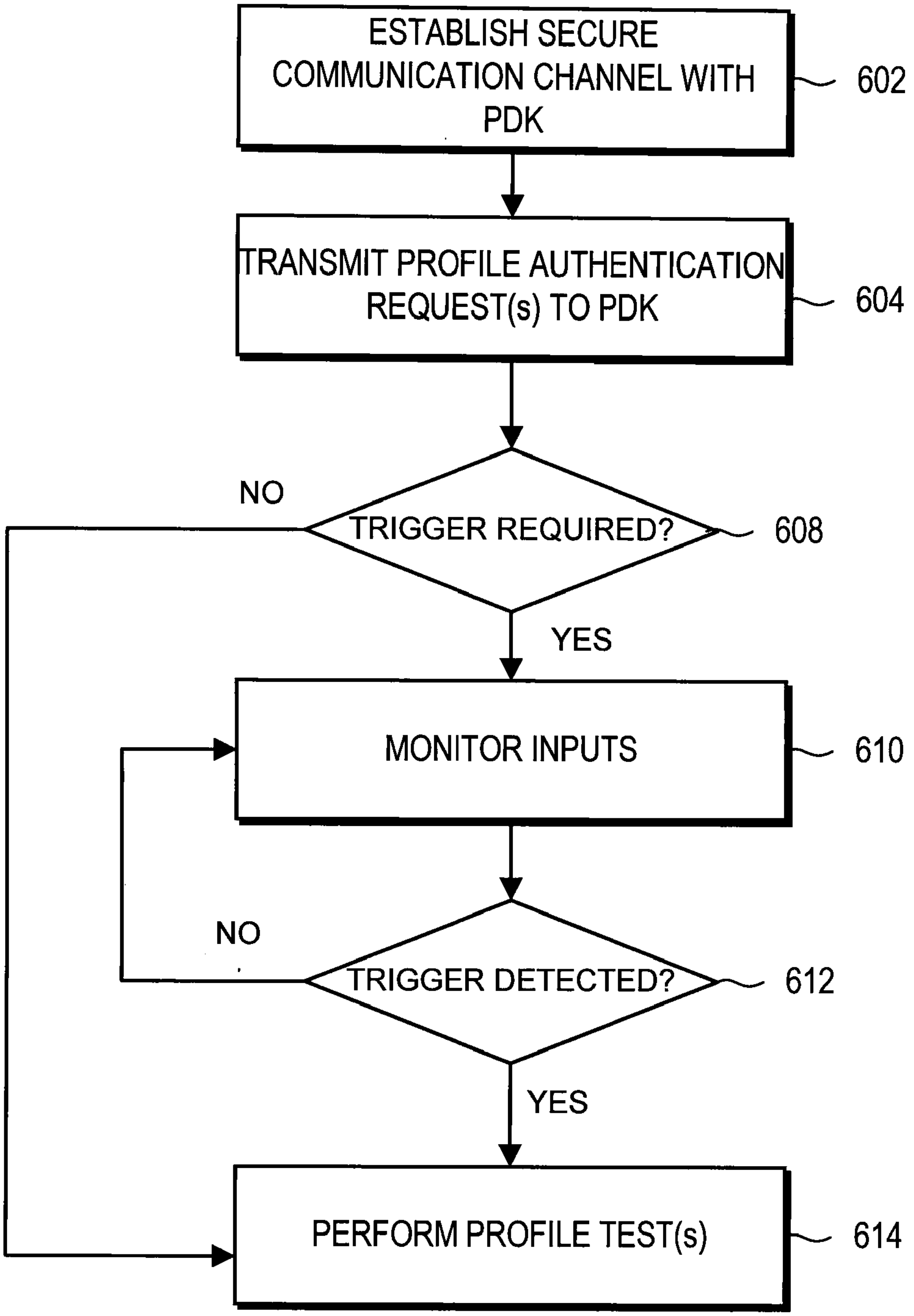
FIG. 6 is a flowchart illustrating one embodiment of a process for profile authentication by a Reader.

Turning now to FIG. 6, an embodiment of a process for profile authentication is illustrated. In step 602, a secure communication channel is established between the RDC 304 and the PDK 102. Information sent and received over the secure channel is in an encrypted format that cannot be practically decoded, retransmitted, reused or replayed to achieve valid responses by an eavesdropping device. The Reader 108 transmits 604 profile authentication requests to the PDK 102 requesting transmission of one or more stored profiles over the secure channel. At 608, the process determines whether a "trigger" is required for authentication. The requirement for a trigger depends on the configuration of the Reader 108, the specific type of transaction to be executed and the type of authentication requested.

In a first configuration, a trigger is required to continue the process because of the type of authentication being used. For example, in biometric authentication, the authentication process cannot continue until the Reader detects a biometric contact and receives biometric information. It is noted that biometric contact is not limited to physical contact and can be, for example, the touch of a finger to a fingerprint scanner, the positioning of a face in front of a facial or retinal scanner, the receipt of a signature, the detection of a voice, the receipt of a DNA sample, RNA sample or derivatives or any other action that permits the Reader 108 to begin acquiring the biometric input 104. By supplying the biometric contact, the user indicates that the authentication and transaction process should proceed. For example, a PDK holder that wants to make a withdrawal from an Automated Teller Machine (ATM) equipped with a Reader 108 initiates the withdrawal by touching a finger to the Reader 108. The ATM then begins the transaction process for the withdrawal.

In a second configuration, some other user action is required as a trigger to proceed with the transaction even if the authentication process itself doesn't necessarily require any input. This can be used for many purchasing transactions to ensure that the purchase is not executed until intent to purchase is clear. For example, a Reader 108 at a gas station can be configured to trigger the transaction when a customer begins dispensing gas. At a supermarket, a Reader 108 can be configured to trigger the transaction when items are scanned at a checkout counter.

In a third configuration, no trigger is used and the Reader 108 automatically completes the remaining authentication/transaction with no explicit action by the user. This configuration is appropriate in situations where the mere presence of a PDK 102 within range of the Reader 108 is by itself a clear indication of the PDK owner's desire to complete a transaction. For example, a Reader 108 can be positioned inside the entrance to a venue hosting an event (e.g., a sporting event, a concert or a movie). When a PDK owner walks through the entrance, the Reader 108 detects the PDK 102 within range, authenticates the user and executes a transaction to purchase an electronic ticket for the event. In another embodiment, the electronic ticket can be purchased in advance, and the Reader 108 can confirm that the user is a ticket holder upon entering the venue. Other examples scenarios where this configuration is useful include boarding a transportation vehicle (e.g., a train, bus, airplane or boat), entering a hotel room or accessing secure facilities or other assets. Thus, if no trigger is required, the process next performs 614 the requested profile authentication tests.

If a trigger is required, the Reader monitors 610 its inputs (e.g., a biometric reader, key pad, etc.) and checks for the detection 612 of a trigger. If the required trigger is detected, the process continues to perform 614 one or more profile authentication tests. FIGS. 7A-7D illustrate various embodiments of profile authentication tests. According to different configurations of the Reader 108, one or more of the illustrated authentication processes may be used. Further, in some embodiments, one or more of the processes may be repeated (e.g., for different types of biometric inputs).

Figure 7B:
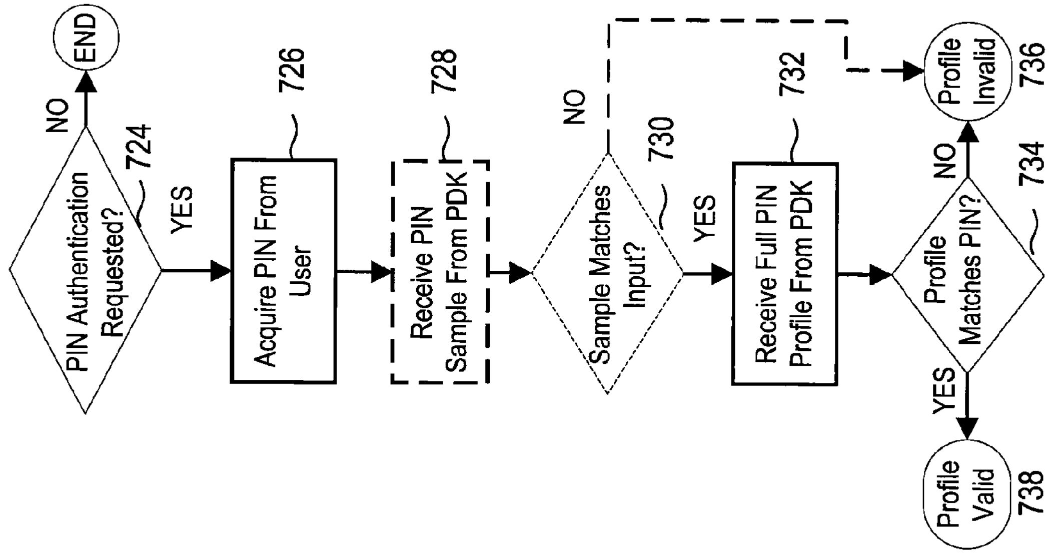
FIG. 7B is a flowchart illustrating one embodiment of a process for profile testing using a personal identification number.
Figure 7A:
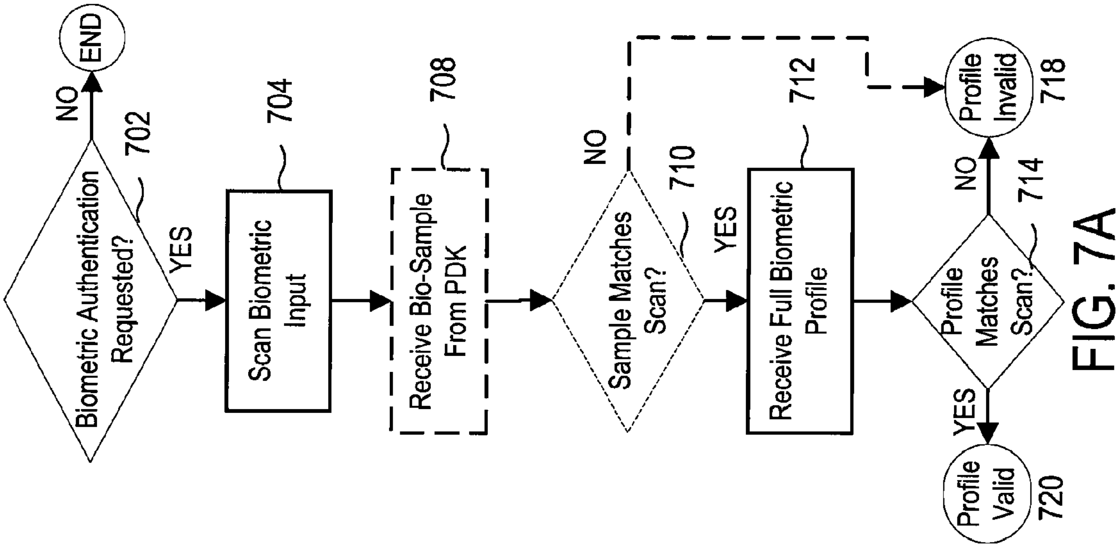
FIG. 7A is a flowchart illustrating one embodiment of a process for profile testing using a biometric input.

Referring first to FIG. 7A, it illustrates a process for biometric authentication. In biometric authentication, a Reader 108 compares a biometric profile stored in the PDK 102 to the biometric input 104 acquired by the biometric reader 302. Advantageously, the biometric input 104 is not persistently stored by the Reader 108, reducing the risk of theft or fraudulent use. If 702 biometric authentication is requested, the Reader 108 scans 704 the biometric input 104 supplied by the user. In one embodiment, scanning 704 includes computing a mathematical representation or hash of the biometric input 104 that can be directly compared to the biometric profile.

Furthermore, in one embodiment, scanning 704 also includes obtaining a biometric input sample from the biometric input according to the same function used to compute the biometric profile sample stored in the PDK 102. Optionally, the Reader 108 receives 708 a biometric profile sample from the PDK 102 and determines 710 if the biometric profile sample matches the biometric input sample. If the biometric profile sample does not match the input sample computed from the scan, the profile is determined to be invalid 718. If the biometric profile sample matches, the full biometric profile 712 is received from the PDK 102 to determine 714 if the full biometric profile 712 matches the complete biometric input 104. If the profile 712 matches the scan, the profile 712 is determined to be valid 720, otherwise the profile 712 is invalid 718. It is noted that in one embodiment, steps 708 and 710 are skipped and only a full comparison is performed. In one embodiment, the biometric profile and/or biometric profile sample is encoded and transmitted to the Reader 108 along with an encoding key and/or algorithm. Then, the Reader 108 uses the encoding key and/or algorithm to recover the biometric profile and/or biometric profile sample. In another alternative embodiment, only the encoding key and/or algorithm is transmitted by the PDK 102 and the biometric profile data is recovered from a remote database in an encoded form that can then be decoded using the key and/or algorithm.

It will be apparent to one of ordinary skill that in alternative embodiments, some of the steps in the biometric profile authentication process can be performed by the PDK 102 instead of the Reader 108 or by an external system coupled to the Reader 108. For example, in one embodiment, the biometric input 104 can be scanned 704 using a biometric reader built into the PDK 102. Furthermore, in one embodiment, the steps of computing the mathematical representation or hash of the biometric input and/or the steps of comparing the biometric input to the biometric profile can be performed by the PDK 102, by the Reader 108, by an external system coupled to the Reader 108 or by any combination of the devices. In one embodiment, at least some of the information is transmitted back and forth between the PDK 102 and the Reader 108 throughout the authentication process. For example, the biometric input 104 can be acquired by the PDK 102, and transmitted to the Reader 108, altered by the Reader 108 and sent back to the PDK 102 for comparison. Other variations of information exchange and processing are possible without departing from the scope of the invention. The transfer of data between the PDK 102 and the Reader 108 and/or sharing of processing can provide can further contribute to ensuring the legitimacy of each device.

FIG. 7B illustrates a process for PIN authentication. If PIN authentication is requested 724, a PIN is acquired 726 from the user through a keypad, mouse, touch screen or other input mechanism. Optionally, the Reader 108 receives 728 a PIN sample from the PDK 102 comprising a subset of data from the full PIN. For example, the PIN sample can comprise the first and last digits of the PIN. If the Reader 108 determines 730 that the PIN sample does not match the input, the profile is immediately determined to be invalid 736. If the PIN sample matches, the full PIN profile is received 732 from the PDK and compared to the input. If the Reader 108 determines 734 that the profile matches the input, the profile is determined to be valid and is otherwise invalid 736. It is noted that in one embodiment, steps 728 and 730 are skipped.

Figure 7C:
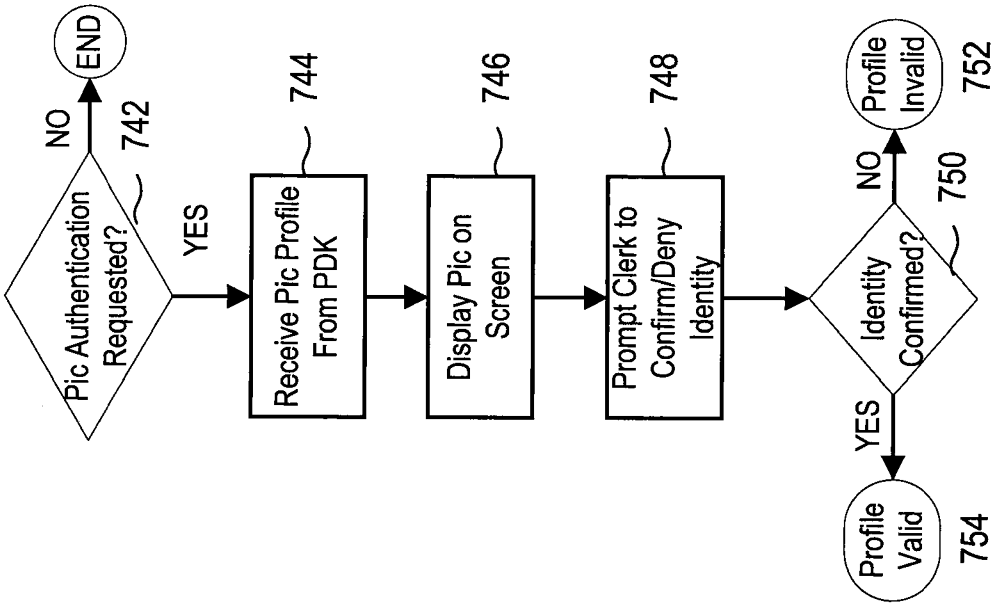
FIG. 7C is a flowchart illustrating one embodiment of a process for profile testing using a picture profile.

FIG. 7C illustrates a process for a picture authentication. If the Reader 108 determines 724 that picture authentication is requested, a picture profile is received 744 from the PDK 102 by the Reader 108 and displayed 746 on a screen. An administrator (e.g., a clerk, security guard, etc.) is prompted 748 to compare the displayed picture to the individual and confirms or denies if the identities match. If the administrator confirms that the identities match, the picture profile is determined to be valid 764 and is otherwise invalid 752. In an alternative embodiment, the process is automated and the administrator input is replaced with a process similar to that described above with reference to FIG. 7A. Here, an image of the user is captured and face recognition is performed by comparing picture profile information received from the PDK 102 to the captured image.

Figure 7D:
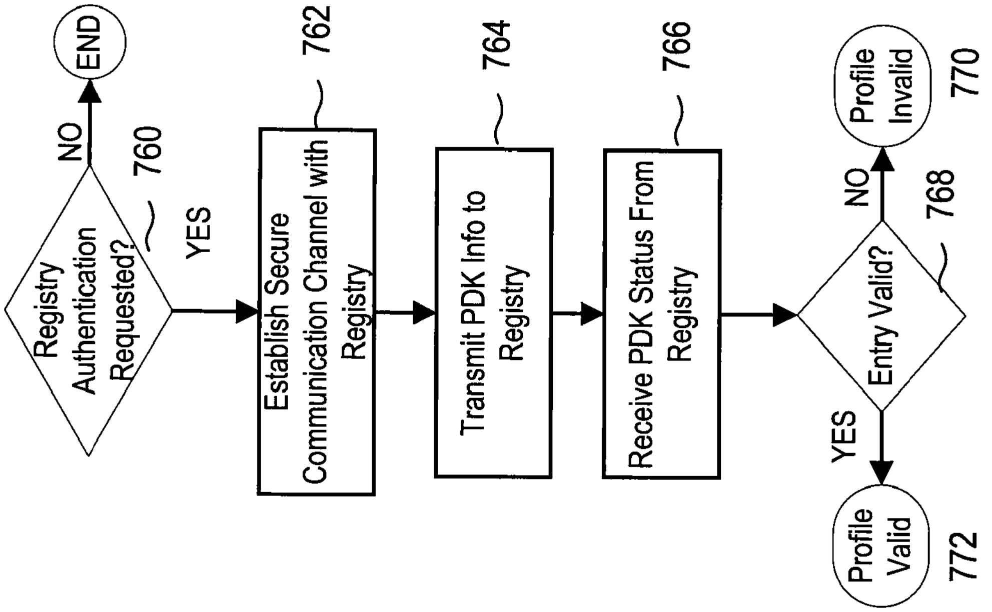
FIG. 7D is a flowchart illustrating one embodiment of a process for profile testing using a private or central registry.

FIG. 7D illustrates a process for authentication with a private registry 114 or the Central Registry 116. If the Reader 108 determines that registry authentication is requested, a secure communication channel is established 762 over the network 110 between the Reader 108 and one or more registries (e.g., the Central Registry 114, any private registry 116 or other validation database 112). If any additional information is needed to process the registry authentication (e.g., a credit card number), the Reader 108 requests and receives the additional information from the PDK 102. Identification information is transmitted 764 from the Reader 108 to the registry 114-116 through the network interface 308. The PDK status is received 766 from the registry to determine 768 if the status is valid 772 or invalid 770. In one embodiment, the information is processed remotely at the registry 114-116 and the registry 114-116 returns a validation decision to the Reader 108. In another embodiment, the Reader 108 queries the private 116 or Central registry 114 for information that is returned to the Reader 108. The information is then analyzed by the Reader 108 and the authorization decision is made locally. In one embodiment, the process involves transmitting credit card (or other purchasing information) to a validation database 112 to authorize the purchase and receive the status of the card. Status information may include, for example, confirmation that the card is active and not reported lost or stolen and that sufficient funds are present to execute the purchase.

Figure 8:
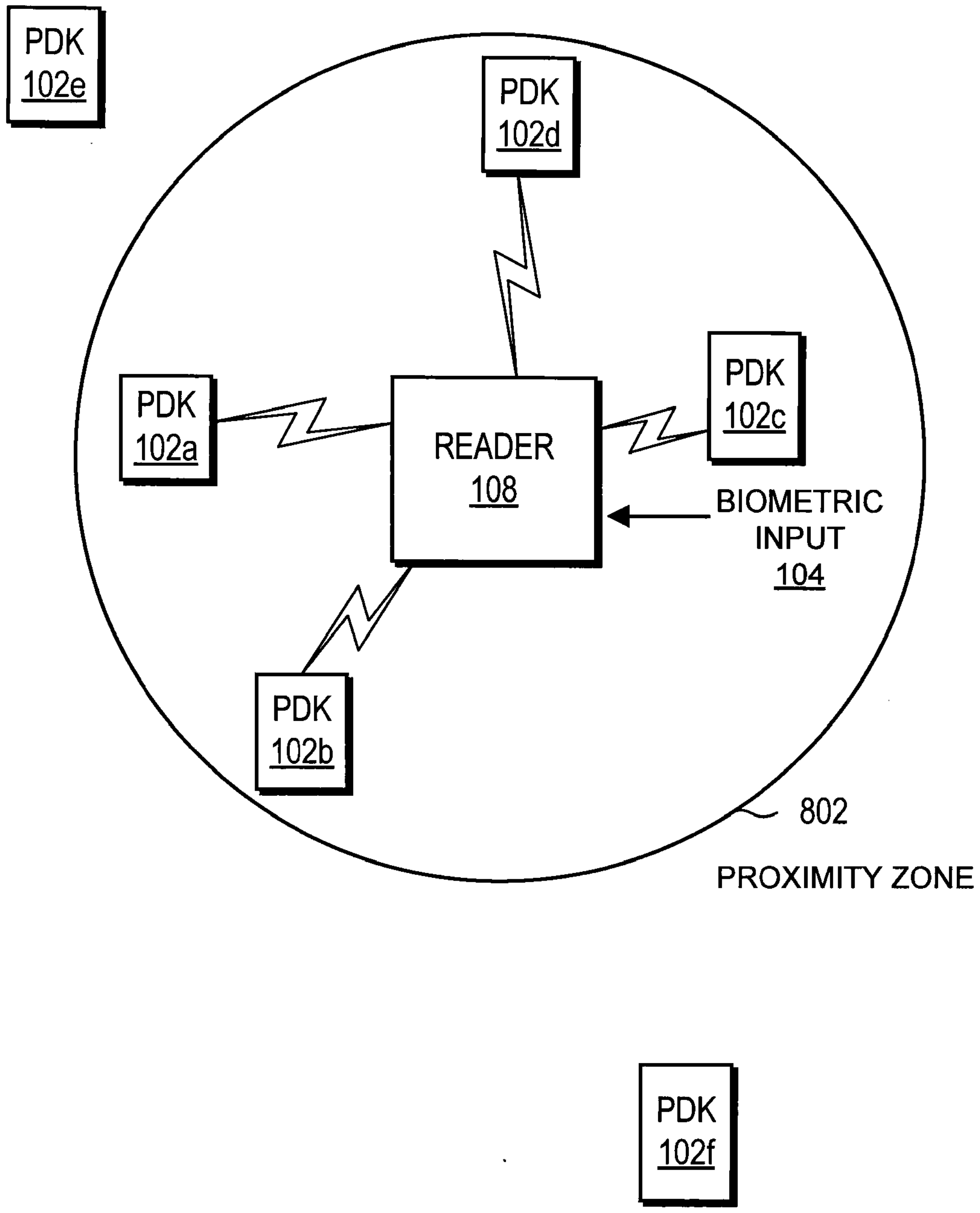
FIG. 8 illustrates an example scenario of a Reader operating in a congested area with multiple PDKs within its proximity zone.

Turning now to FIG. 8, a scenario is illustrated where multiple PDKs 102*a-e* are present near a Reader 108. This scenario is common when a Reader 108 is located in a high occupancy area such as, for example, a casino floor. Here, the Reader 108 can communicate with PDKs 102*a-d* within the proximity zone 802 and does not communicate with PDKs 102*e-f* outside the proximity zone 802. In one embodiment, the Reader 108 receives the unique PDK ID from a PDK 102 when it enters the proximity zone 802 and records its time of arrival. In one embodiment, the Reader 108 further initiates a device authentication of the PDK 102 after a predefined period of time (e.g., 5 seconds) that the PDK 102 is within the proximity zone 802. For profile authentication, the Reader 108 automatically determines which PDK 102 should be associated with an authentication test and the transaction. For example, if the Reader 108 receives a biometric input 104 from an individual, the Reader 108 automatically determines which PDK 102*a-d* is associated with the individual supplying the biometric input 104. In another embodiment, a different trigger is detected (e.g., a PIN input) to initiate the differentiation decision. In yet another embodiment, the differentiation decision is initiated without any trigger. It is noted that in some embodiments, where no trigger is required (such as a registry authentication), no differentiation decision is made and authentications are instead performed for each PDK 102 within the proximity zone 802.

Figure 9:
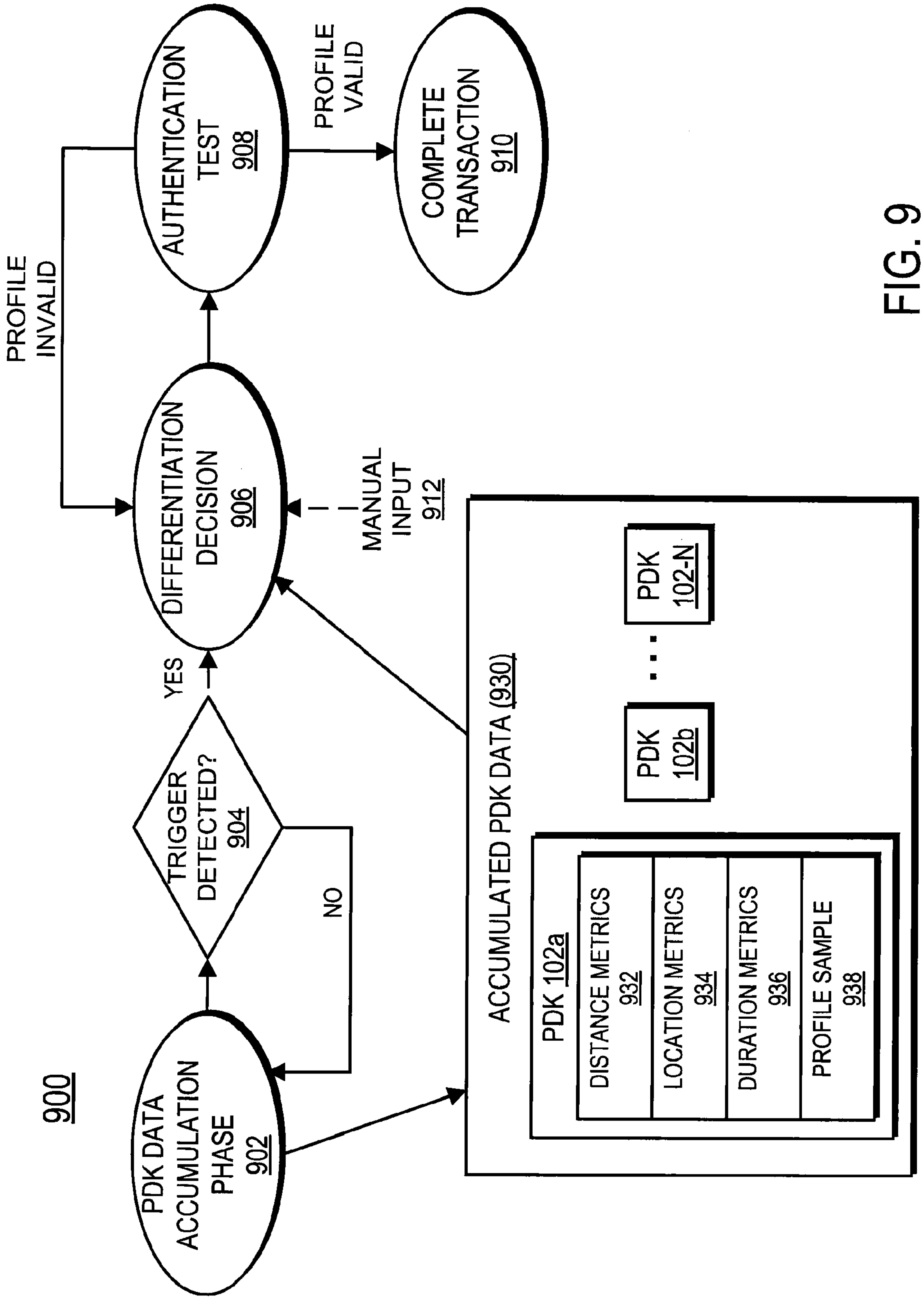
FIG. 9 is a flowchart illustrating one embodiment of a process for differentiating between multiple PDKs in completing a secure authentication process.

FIG. 9 illustrates an embodiment of an authentication process 900 for the scenario where multiple PDKs 102 are present within the proximity zone 802 of the Reader 108. In a PDK data accumulation phase 902, PDK data 930 is accumulated and buffered in the Reader 108 for any valid PDKs 102 that enter the proximity zone 802. In one embodiment, the accumulation phase 902 begins for a PDK 102 after it has been within the proximity zone for a predetermined period of time. In one embodiment, the PDK data accumulation phase 902 is similar to the steps 402-408 described above in detail with reference to FIG. 4 for each PDK 102*a-d* in the proximity zone 802.

As illustrated, the accumulated PDK data 930 includes one or more differentiation metrics from each valid PDK 102 within range of the Reader 108. The differentiation metrics can include any information that can be used by the Reader 108 to determine which PDK 102 should be associated with the authentication and/or transaction request. According to various embodiments, differentiation metrics can include one or more of distance metrics 932, location metrics 934 and duration metrics 936.

In one embodiment, a distance metric 932 indicates the relative distance of a PDK 102 to the Reader 108. This information is useful given that a PDK 102 having the shortest distance to the Reader 108 is generally more likely to be associated with a received authentication trigger (e.g., a biometric input, a PIN input or a transaction request). The distance metrics 932 can include, for example, bit error rates, packet error rates and/or signal strength of the PDKs 102. These communication measurements can be obtained using a number of conventional techniques that will be apparent to those of ordinary skill in the art. Generally, lower error rates and high signal strength indicate the PDK 102 is closer to the Reader 108.

Location metrics 934 can be used to determine a location of a PDK 102 and to track movement of a PDK 102 throughout an area. This information can be useful in determining the intent of the PDK holder to execute a transaction. For example, a PDK holder that moves in a direct path towards an electronic gaming machine and then stops in the vicinity of the electronic gaming machine is likely ready to begin wagering at the game. On the other hand, if the PDK moves back and forth from the vicinity of the electronic gaming machine, that PDK holder is likely to be browsing and not ready to play. Examples of systems for determining location metrics are described in more detail below with reference to FIGS. 10-11.

The differentiation metrics can also include duration metrics 936 that tracks the relative duration a PDK 102 remains within the proximity zone 802. Generally, the PDK 102 with the longest time duration within the proximity zone is most likely to be associated with the authentication request. For example, if the Reader 108 is busy processing a purchasing transaction at a cashier and another PDK 102 has a long duration within the proximity zone 802, it is likely that the user is waiting in line to make a purchase. In another example, a PDK 102 that has been in front of a gaming machine for a long period of time is a likely indicator that the player is ready to wager at the game. In one embodiment, the Reader 108 tracks duration 936 by starting a timer associated with a PDK 102 when the PDK 102 enters the proximity zone 802 and resetting the time to zero when the PDK exists.

In one embodiment, the Reader 108 can also receive and buffer profile samples 938 prior to the start of a profile authentication instead of during the authentication process as described in FIG. 7A-7B. In one embodiment, the Reader 108 determines which types of biometric profile samples 938 to request based on, for example, the configuration of the Reader 108, the type of transactions performed by the Reader 108 or manual requests from a clerk, security guard, etc. In one embodiment, the PDK 102 transmits one or more of the requested sample types based on profiles available in the PDK 102 and/or user preferences. In another embodiment, the PDK 102 transmits one or more samples 938 it has available and only samples that match the authentication types configured for the Reader 108 are buffered. For example, if a Reader 108 is configured for fingerprint authentication, a PDK 102 may transmit samples 938 for several different fingerprint profiles (each corresponding to a different finger, for example). It will be apparent to one of ordinary skill in the art that other variations are possible to provide flexibility in both the configuration of the Reader 108 for various types of authentication and flexibility for the PDK owner to determine which types of authentication to use.

Because profile samples 938 only comprise a subset of the profile information, in one embodiment, the samples can be safely transmitted over a public channel without needing any encryption. In another embodiment, the profile samples 938 are transmitted with at least some level of encryption. In yet another embodiment, some of the data is transmitted over a public communication channel and additional data is transmitted over a secure communication channel. In different configurations, other types of profile information can be accumulated in advance. For example, in one embodiment, a photograph from a picture profile can be obtained by the Reader 102 during the data accumulation phase 902. By accumulating the profile sample 938 or other additional information in advance, the Reader 108 can complete the authentication process more quickly because it does not wait to receive the information during authentication. This efficiency becomes increasingly important as the number of PDKs 102 within the proximity zone 802 at the time of the transaction becomes larger.

The PDK accumulation phase 902 continues until a trigger (e.g., detection of a biometric input) is detected 904 to initiate a profile authentication process. If a biometric input is received, for example, the Reader 108 computes a mathematical representation or hash of the input that can be compared to a biometric profile and computes one or more input samples from the biometric input. It is noted that in alternative embodiments, the process can continue without any trigger.

For example, in one embodiment, the transaction can be initiated when a PDK 102 reaches a predefined distance from the Reader 108 or when the PDK 102 remains within the proximity zone 802 for a predetermined length of time.

The process then computes a differentiation decision 906 to determine which PDK 102*a-d* should be associated with the authentication. In one embodiment, the Reader 108 computes a differentiation result for each PDK using one or more of the accumulated data fields 930. For example, in one embodiment, the differentiation result is computed as a linear combination of weighted values representing one or more of the differentiation metrics. In another embodiment, a more complex function is used. The differentiation results of each PDK 102 are compared and a PDK 102 is selected that is most likely to be associated with the transaction.

In another embodiment, for example, in a photo authentication, the differentiation decision can be made manually by a clerk, security guard or other administrator that provides a manual input 912. In such an embodiment, a photograph from one or more PDKs 102 within the proximity zone 802 can be presented to the clerk, security guard or other administrator on a display and he/she can select which individual to associate with the transaction. In yet another configuration, the decision is made automatically by the Reader 108 but the clerk is given the option to override the decision.

An authentication test 908 is initiated for the selected PDK 102. The authentication test 908 can include one or more of the processes illustrated in FIGS. 7A-7D. Note that if profile samples 938 are acquired in advance, they need not be acquired again in the authentication steps of FIGS. 7A-7B. It is additionally noted that in one embodiment, the Reader 108 compares the profile samples 938 of the PDKs 102 to the computed input sample until a match is found before performing a full profile comparison. In one embodiment, the Reader first compares samples from the selected PDK 102 until a match is found. For example, a Reader 108 may have accumulated multiple fingerprint profiles samples 938 (e.g., corresponding to different fingers) for the selected PDK 102. The Reader 108 receives a fingerprint input from, for example, the left index finger, computes the input sample and does a quick comparison against the accumulated samples 938 for the selected PDK 102 to efficiently determine a matching profile. The Reader 108 then performs the full comparison using the matching profile. In an alternative embodiment, the Reader 108 performs a comparison of a first sample from each PDK 102 and if no match is found, performs comparisons of second samples from each PDK 102. It will be apparent to one of ordinary skill in the art that samples can be compared in a variety of other orders without departing from the scope of the invention.

If the authentication test 908 indicates a valid profile, the transaction is completed 910 for the matching PDK 102. If the authentication test 908 determines the profile is invalid, a new differentiation decision 906 is made to determine the next mostly likely PDK 102 to be associated with the transaction. The process repeats until a valid profile is found or all the PDKs 102 are determined to be invalid.

Figure 10:
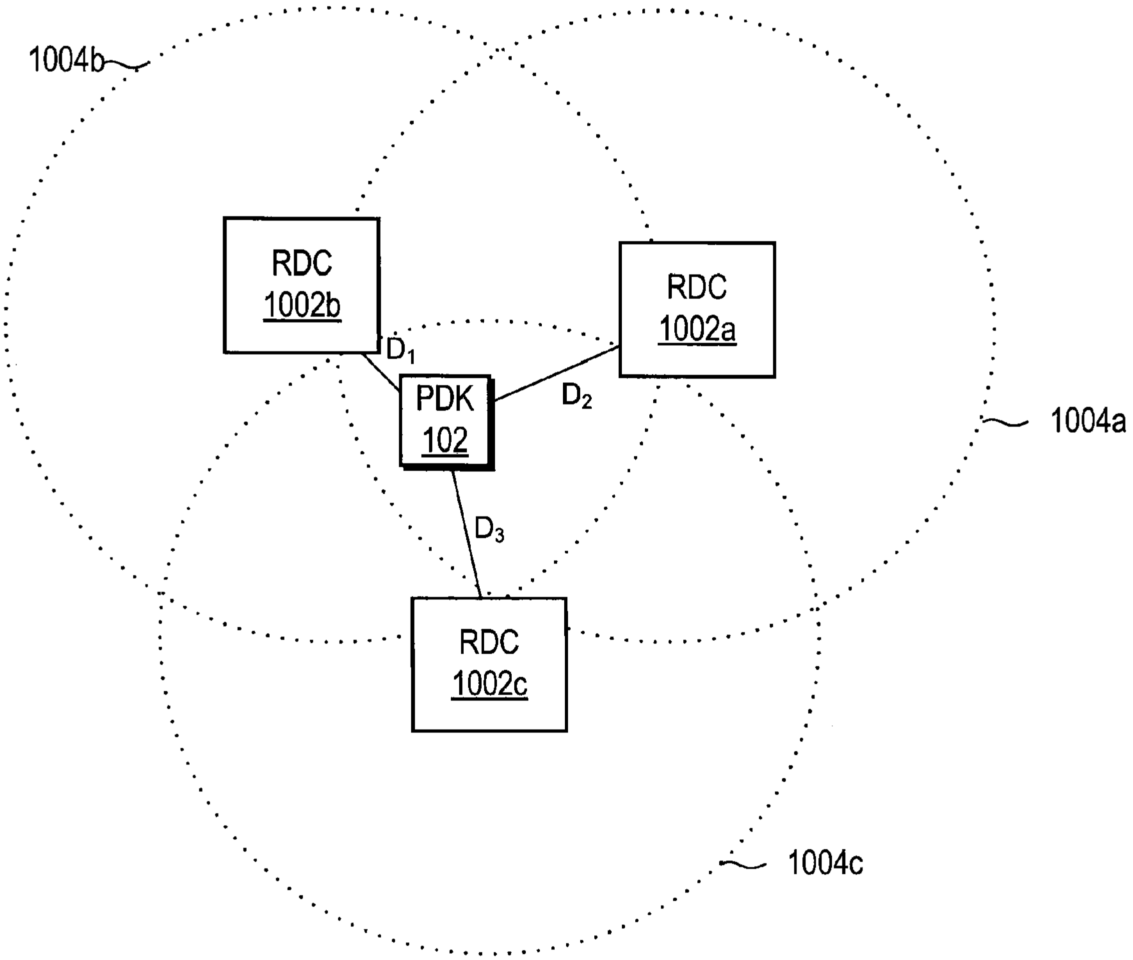
FIG. 10 is a block diagram illustrating one embodiment of a system for estimating location of a PDK using coordinate triangulation.

Turning now to FIG. 10, an example system is illustrated for determining a location metric 934 of a PDK 102 using a coordinate triangulation technique. In one embodiment of coordinate triangulation, multiple RDCs (e.g., RDCs 1002*a-c*) are spaced throughout an area. In one embodiment, the RDCs 1002 are coupled by a network. Each RDC 1002 has a range 1004 and the ranges 1004 overlap. Each RDC 1002 determines a distance D1-D3 between the RDC 1002 and the PDK 102. Distance may be estimated, for example, by monitoring signal strength and/or bit error rate as previously described. Then using conventional trigonometry, an approximate location of the PDK 102 can be calculated from D1-D3. Although only three RDCs are illustrated, it will be apparent that any number of RDCs can be used to sufficiently cover a desired area. Location information can be computed at predetermined time intervals to track the movement of PDKs throughout a facility.

Figure 11:
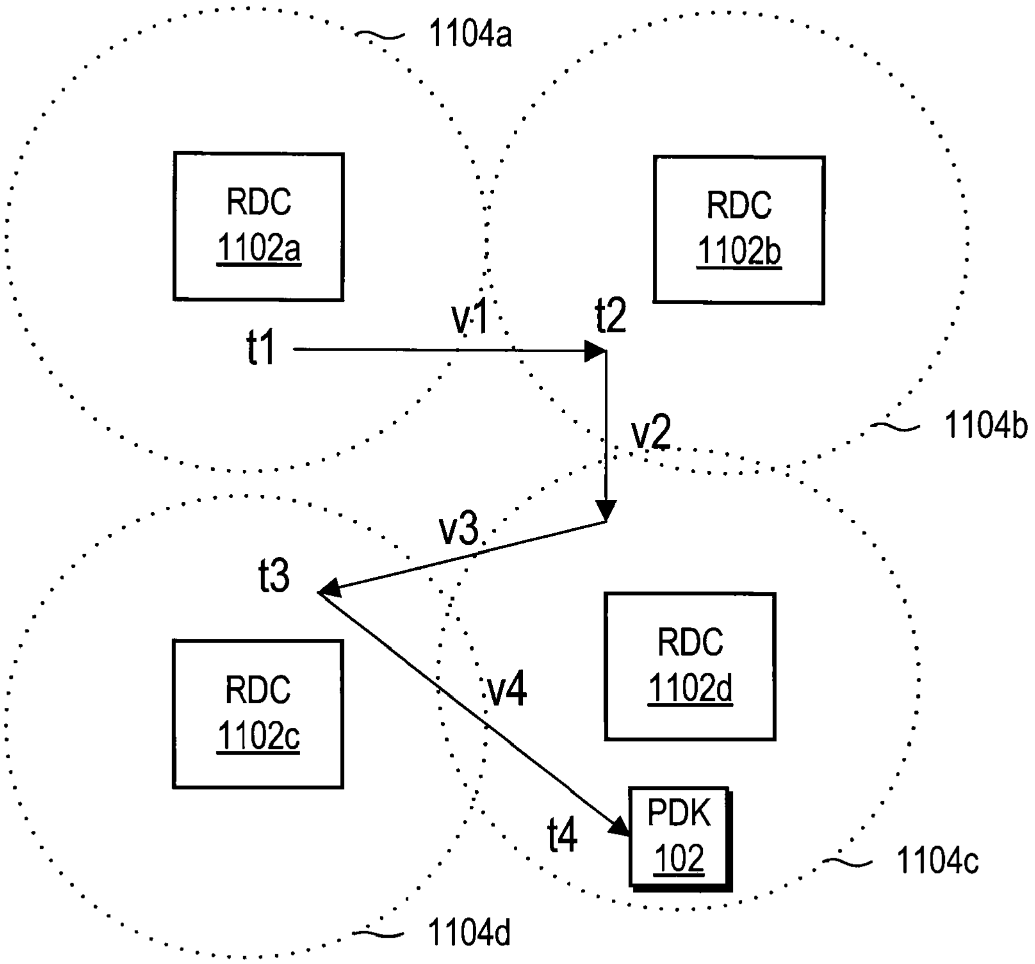
FIG. 11 is a block diagram illustrating one embodiment of a system for location tracking of a PDK.

Another embodiment of location tracking is illustrated in FIG. 11. Here, RDCs 1102 having ranges 1104 are distributed throughout an area. The ranges 1104 can vary and can be overlapping or non-overlapping. In this embodiment, each RDC 1102 can detect when a PDK 102 enters or exists its range boundaries 1104. By time-stamping the boundary crossings, a location vector can be determined to track the PDK's movement. For example, at a first time, t1, the PDK 102 is detected within the range of RDC 1102*a*. At a second time, t2, the PDK 102 is detected within the range of RDC 1102*b*. At a third time, t3, the PDK 102 is within the range of RDC 1102*c* and at a fourth time, t4, the PDK 102 is within the range of RDC 1102*d*. Using the location and time information, approximate motion vectors, v1, v2, v3 and v4 can be computed to track the motion of the PDK 102 without necessarily computing exact distance measurements.

A group of networked RDCs 302 provides the ability to detect, authenticate and exchange data with one or more PDKs simultaneously. Responsive to detecting and identifying a PDK 102, the system can configure an interface on the PDK 102 and/or electronic devices 105 on the network. Furthermore, the system can cause the device 105 or PDK 102 to execute a set of functions. In one embodiment, an electronic device 105 can cause personalized messages, settings, services, etc. to display to a customer that has approached the device 105 and is carrying a PDK 102. For example, an ATM can be configured to automatically access a user's account, a gaming machine can be automatically configured to match a specific user's preferences, a hotel room can automatically allow unlock for a specific individual and so on. For the purpose of illustration only, examples uses of the system are provided for applications in a hotel/casino environment. As will be apparent to one of ordinary skill in the art, other applications are also possible without departing from the principles of the invention disclosed herein.

Figure 12:
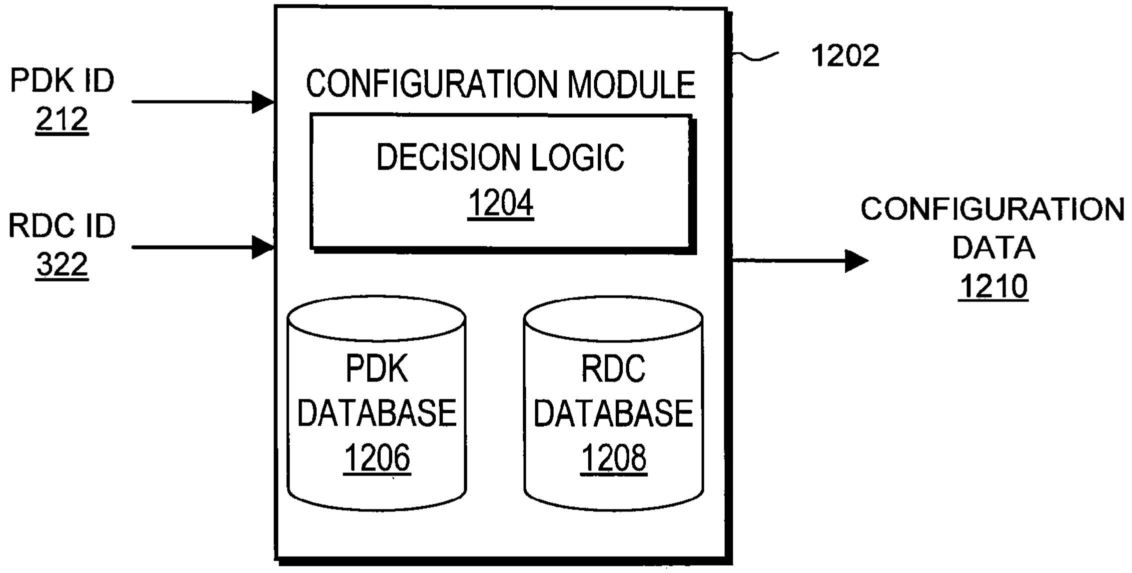
FIG. 12 is a block diagram illustrating a system for determining configuration of a PDK and/or an electronic device.

Referring now to FIG. 12, a configuration module 1202 is illustrated for dynamically configuring operation of a PDK 102 and/or an electronic device 105 with an integrated Reader 108. The configuration module 1202 receives a PDK ID 212 identifying a PDK 102 and an RDC ID 322 identifying an RDC 304. Based on the identity information 212, 322 the configuration module 1202 determines configuration data 1210 specifying the operation of the electronic device 105 and/or the PDK 102. In one embodiment, the configuration module 1202 is embedded in a remote server (e.g., server 340) that communicates with the Reader 108 via the network 110. Alternatively, all or parts of the configuration module 1202 are implemented within the electronic device 105 or within the PDK 102. In one embodiment, functions of the configuration module 1202 are distributed between a PDK 102, an electronic device 105 and/or remote servers or databases.

The configuration module 1202 comprises decision logic 1204, a PDK database 1206 and an RDC database 1208. The PDK database 1206 and RDC database 1208 store state information associated with PDK IDs 212 and RDC IDs 322 respectively. In one embodiment, the PDK state information may include; for example, information identifying the type of PDK 102 (e.g., a customer PDK, an employee PDK, an asset tracking PDK, etc.). The PDK state information may furthermore include a list of preferences associated with the PDK ID 212 (e.g., a casino patron's favorite drink, gaming preferences, room preferences, etc.). The state information may further include historical information relating to past uses of the PDK 102 (e.g., a casino patron's betting trends, player rating, etc.). The RDC state information may include, for example, the type of electronic device 105 associated with the RDC 304 (e.g., a gaming machine, a kiosk, a point of sale terminal, a locking device, etc.), a location of the RDC 304, historic data associated with previous interactions with the RDC 304 and/or associated electronic device 105 and so on. PDK and RDC state information may also include different versions of a user interface that are specific to different electronic devices 105 or customized for a specific user. Information in the PDK database 1206 and the RDC database 1208 can be modified manually or updated automatically to reflect the current states of the PDKs 102 and RDCs 304 in the databases 1206, 1208.

The decision logic 1204 processes PDK and RDC state information retrieved from the PDK database 1206 and RDC database 1208 respectively and determines configuration data 1210 specific to the PDK 102 and RDC 304. The configuration data 1210 is transmitted to the electronic device 105 and specifies a sequence of functions to be performed by the electronic device 105. This may include, for example, configuring an interface on the electronic device 105, instructing the PDK 102 to configure its interface, storing acquired information, causing a door to unlock, etc. Furthermore, the configuration data 1210 may include specific functions to be executed by the PDK 102 or other networked devices.

Figure 13:
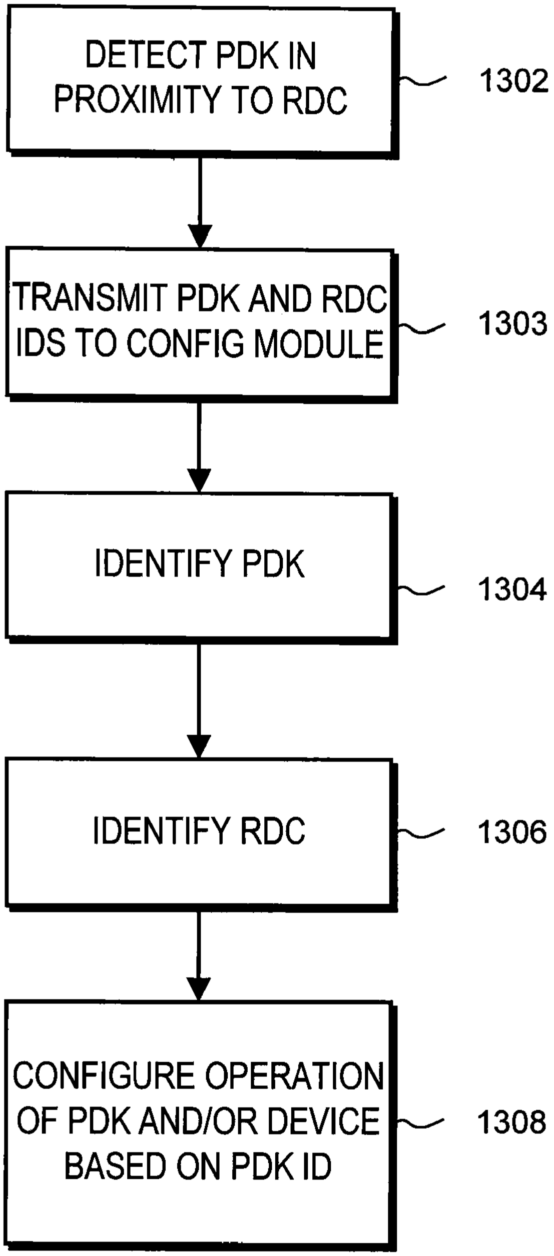
FIG. 13 is a flowchart illustrating a process for determining operation of a PDK or electronic device.

An embodiment of a process of dynamically configuring operation of a PDK 102 and/or an electronic device 105 with an embedded RDC 304 is described in FIG. 13. The RDC 304 detects 1302 a PDK 102 in proximity to the RDC 304 and the PDK ID 212 and RDC ID 322 are transmitted 1303 to the configuration module 1202. The configuration module 1202 identifies 1304 the PDK 102 based on the PDK ID 212 and identifies 1306 the RDC 304 based on the RDC ID 322. Based on the PDK ID 212 and the RDC ID 322, the configuration module 1202 outputs configuration data 1210 to configure 1308 the operation of the PDK 102 and/or the electronic device 105.

Figure 14:
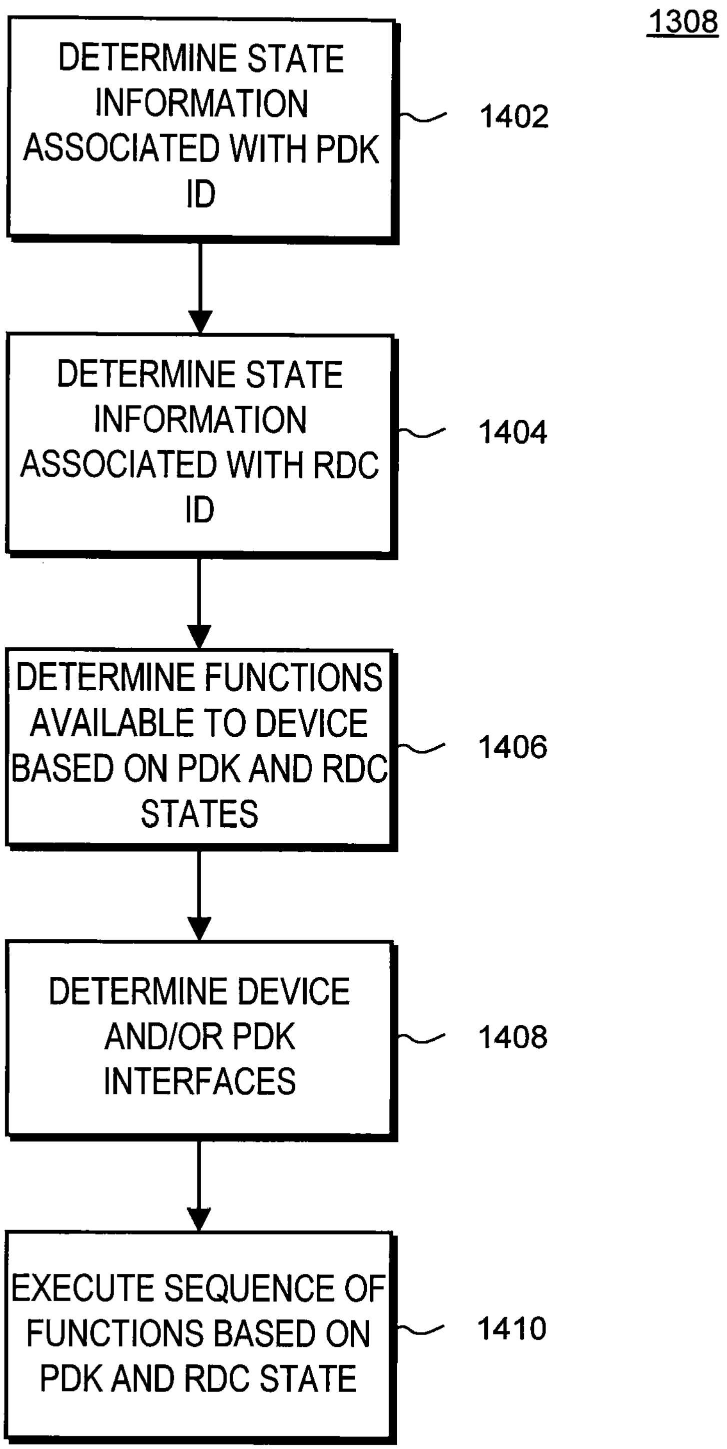
FIG. 14 is a flowchart illustrating a process for configuring interfaces of a PDK and/or device and executing tasks based on stored state information.

Turning now to FIG. 14, another embodiment of a process for configuring 1308 operation of a PDK 102 and/or the electronic device 105 based on acquired IDs is now described. The configuration module 1202 first determines 1402 state information associated with the PDK ID 212 from the PDK database 1206. The configuration module 1202 also determines 1404 state information associated with the RDC ID 322 from the RDC database 1208. Based on the PDK and RDC state information, the decision logic 1204 determines 1406 one or more functions that can be executed by the electronic device 105. For example, if the electronic device 105 is an electronic gaming machines, a different set of functions are available than if the device 105 is an Automated Teller Machine (ATM). The configuration module 1202 then determines 1408 a set of interfaces to be assigned to the electronic device 105, the PDK 102 or other networked devices. Interfaces may include, for example, particular graphics or text to display on the device 105, the PDK 102 and/or surrounding signage. The interfaces may additionally specify an association of soft keys on the electronic device 105 and/or the PDK 102 with specific functions. Determining 1408 the set of interfaces may also include determining a communication path for handling inputs to the interface. For example, on a PDK interface, the communication path may specify that an input is transmitted from the PDK 102 to the RDC 304 to a server. The configuration module then executes 1410 a sequence of functions. Functions may be executed by the PDK 102, the electronic device 108 or both depending on the PDK and RDC state information. The processes of FIGS. 13-14 can be applied to many example usage scenarios as will be described below.

Figure 15:
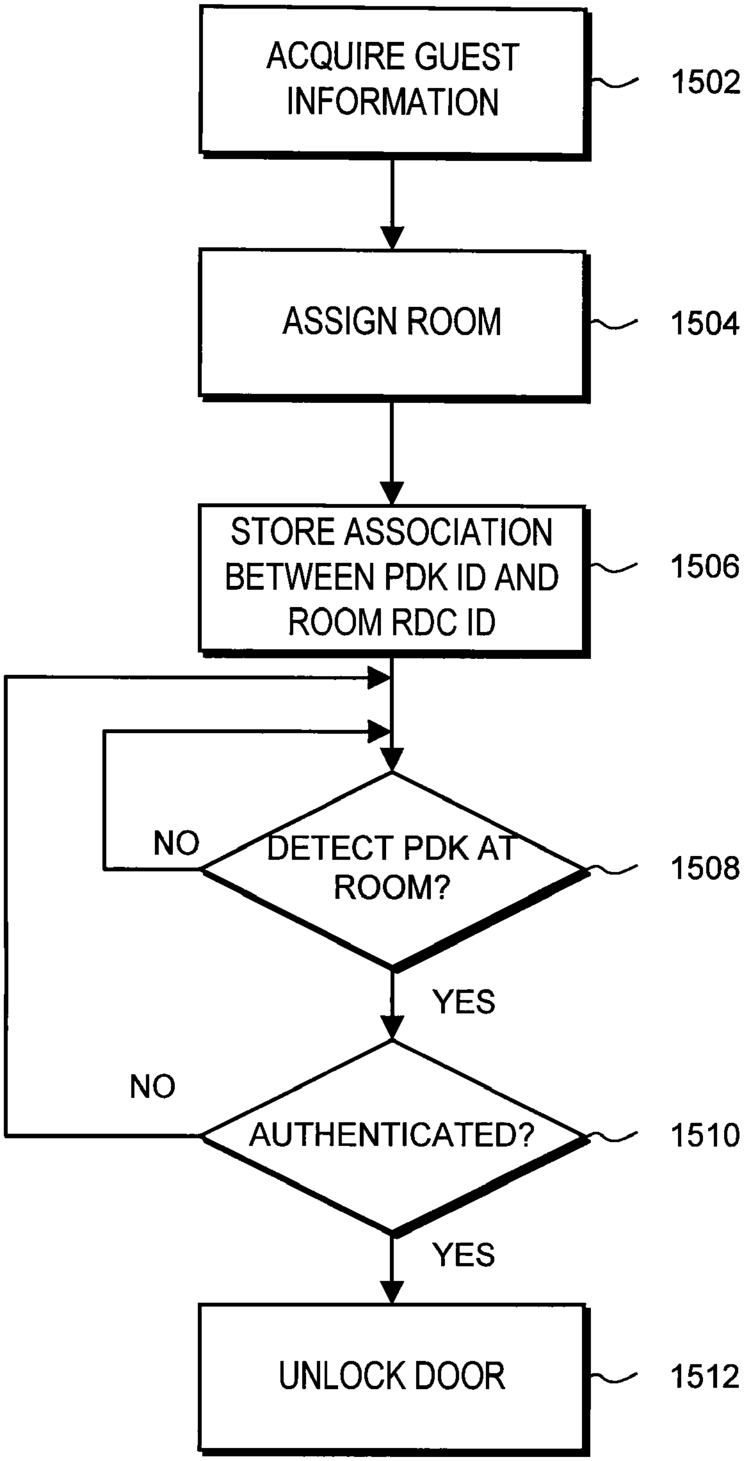
FIG. 15 is a flowchart illustrating an embodiment of configuration of a hotel check system.

FIG. 15 illustrates an example hotel check in process based on the general steps described above. In this scenario, a welcome kiosk with an integrated Reader 108 may be located at the entrance to the hotel property. The RDC 304 automatically detects a patron's PDK 102 as he/she enters the property and is in proximity to the RDC 304. Based on the RDC ID 322 and the PDK ID 212, the configuration module 1202 determines that a specific patron has arrived at the hotel at a specific entrance. The configuration module 1202 then determines specific interfaces to apply to the welcome kiosk and/or PDK 102 to assist checking in the patron. For example, the configuration module 1202 can acquire 1502 information about the guest by, for example, looking up room preferences associated with the patron in the PDK database 1208. These preferences may be based on choices manually entered by the patron when reserving the room or based on prior reservations. A player rating associated with the PDK ID 212 may determine if the patron should be offered a standard room or a suite. Based in part on the preferences and/or other state information, a room is assigned 1504 to the patron.

In one embodiment, the configuration data 1210 instructs the welcome kiosk to display the room assignment on a kiosk screen, on overhead signage or on the user's PDK 102. The configuration data 1210 may further specify user interfaces for the PDK 102, the welcome kiosk or both. For example, an interface can be provided that permits the patron to review or modify the assignment or choose from available options. Selections can be made using soft keys that are assigned to specific functions (e.g., confirm, cancel, modify, etc.). Once confirmed, the system stores 1506 an association of the PDK ID 212 with the room in the PDK database 1206.

The patron can then be directed to the room. For example, in one embodiment, overhead signage displays the patron's name, a room number and directions to the room. In another embodiment, the kiosk prints a paper receipt providing the room assignment and/or providing directions to the room. When the patron arrives at the room, an RDC 304 at the room detects 1508 the PDK 102 and transmits the PDK ID 212 and RDC ID 322 to the configuration module 1002. The configuration module 1002 identifies the patron based on the PDK ID 212 and identifies the location of the patron by the RDC ID 322 to determine if the patron is authenticated 1510. In some embodiments, a biometric authentication (e.g., a fingerprint scan) is requested to provide an addition level of security. If the patron is at his/her assigned room, the configuration module 1002 outputs configuration data 1210 including an instruction to unlock 1512 the door (e.g., using an electronic security mechanism interfaced to the RDC 304). Similar process may be used for other hotel/casino services such as, for example, check out, valet services, restaurant arrivals, etc.

In a second usage scenario, the process can be applied to personalizing gaming sessions on a casino floor. In this embodiment, an electronic gaming machine or gaming table is modified to communicate with a Reader 108. When the player enters a proximity zone of the RDC 304, the RDC 304 detects the player's PDK 102. The configuration data 1210 instructs the gaming device to create a gaming session specific to the player. For example, the configuration of the gaming session may be based on player preferences, historical play or the player's rating stored in the PDK database 1206 in association with the PDK ID 212. In one embodiment, player preferences associated with the patron's PDK 102 may be used to automate and target downloadable gaming options/features. The gaming machine may then be reconfigured with an interface that allows the patron to confirm or modify the pre-selected gaming preferences. In one embodiment, passively collected data can be used to determine player rating systems. The rating may be based on, for example, games played, games not played, level of betting, amount of time playing, etc. Based on the player rating, a player may be provided with tiered (VIP levels, etc) customer services.

Figure 16:
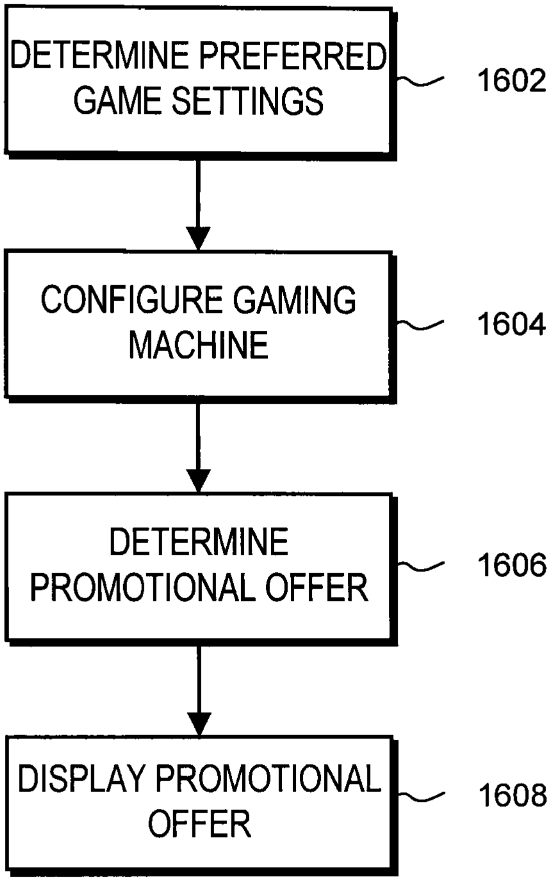
FIG. 16 is a flowchart illustrating an embodiment of a process for configuration of a gaming machine.

Another example scenario is described in the process of FIG. 16. In one embodiment, from an RDC ID 322 and a PDK ID 212, an idle gaming device detects an inactive PDK 102 and determines 1602 the player's preferred game settings. The gamine device is automatically configured 1604 to attract the player to the idle gaming device. For example, gaming devices may change their current configuration settings to match previously acquired preferences of a player in the vicinity. The personalized configuration may include loading the player's favorite game or configuring the game for the player's favorite denomination or types of bets. In one embodiment, the configuration can include determining 1606 a promotional offer for the player such as offering free game play or providing marketing, promotion or rewards opportunities. For example, the player could be offered a Keno/drawing ticket, a greeting from a host/attendant, a free drink, free show tickets or a free dinner. The promotional offers are displayed 1608 in order to up sale the non-gambling player and entice the player to place additional wagers at the electronic gaming machine.

In another scenario, a particular RDC's 304 coverage area may designate a "hot spot" on the casino floor. A player that enters the hot spot (by entering the range of the RDC 304) may receive, for example, free points added to player's account balances, free games offers or other promotions. This may attract customers to locations of the casino that may otherwise tend to be less traveled. Offers can be displayed, for example, on overhead signage or directly on the user's PDK 102. In other embodiment, the PDK 102 is configured to provide a menu interface allowing the customer to select from a variety of promotional offers.

In another example, a gaming machine can be configured to enforce responsible gaming limits based on cutoff options associated with the patron's PDK 102. For example, the configuration module 1202 may determine that an electronic gaming machine should be disabled once a particular wagering limit is reached. In another example, credit or electronic fund transfers may be automatically disabled beyond a certain limit. In one embodiment, the limitations may be confined to specified time period. For example, after a pre-determined amount of time, the patron can begin gaming again.

Figure 17:
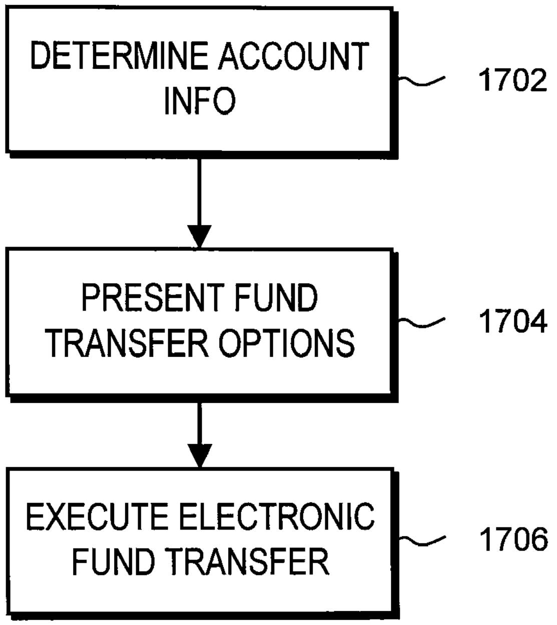
FIG. 17 is a flowchart illustrating an embodiment of a process for configuration of an electronic fund transfer system.

In yet another usage scenario, the process can be used to enable efficient and secure deposit or withdrawal of funds as illustrated in FIG. 17. For example, a cashier kiosk can be coupled to a Reader 108. When a patron approaches the cashier kiosk, the configuration module 1202 determines 1702 account information associated with the patron. The interface on the kiosk is automatically configured to provide the user with his/her own personal account information. The configuration module 1202 then configures the kiosk interface to present 1704 fund transfer options to the patron. Based on the patron's selection, an electronic fund transfer is executed 1706. For example, cash can be withdrawn or funds can be transferred to a linked electronic PDK account. In one embodiment, the funds in the linked PDK account can then be used with any electronic gaming machine. When the patron approaches a gaming machine, the patron is presented with the option of applying the linked PDK account funds to the game. If confirmed, the funds are automatically withdrawn and the patron can begin play. The cashier kiosk could also be used to allow customers to transfer credits to other customers.

In one embodiment, a user can be offered a choice of utilizing biometric, PIN or other secondary-authentication options for fund transactions. Alternatively the casino can decide to require a particular level and type of authentication. For example, the casino may employ photo profile authentication at a cashier cage. A cashier can visually compare an image retrieved from photo profile in the PDK 102 to the actual person prior to authorizing a financial transaction.

The system can also facilitate dispatch of drinks, food, assistance, etc. to patrons on the casino floor. For example, a patron's favorite drink can be stored in the PDK database 102 and associated with his/her PDK ID 212. A casino staff member can be alerted to the location of the patron and his/her favorite drink by a display on the staff member's PDK 102 or on a service kiosk. The staff member can then dispatch the favorite drink to the player after a pre-determined amount of time at an electronic gaming machine, table game or other casino location. In another embodiment, the staff member can be dispatched responsive to the patron pressing a button on the PDK 102 or on a user interface menu. In one embodiment, a beverage server can carry an electronic location map that shows the location of the individual. The location map can be, for example, on a display screen at the beverage dispatch center, on a display on the beverage tray, or using another mobile display (e.g., a PDA). Thus, as customer moves around the property, the server can be re-directed to the new patron location in real time. The patrons face may be displayed to the server to visually identify the patron once in close proximity to each other.

Figure 18:
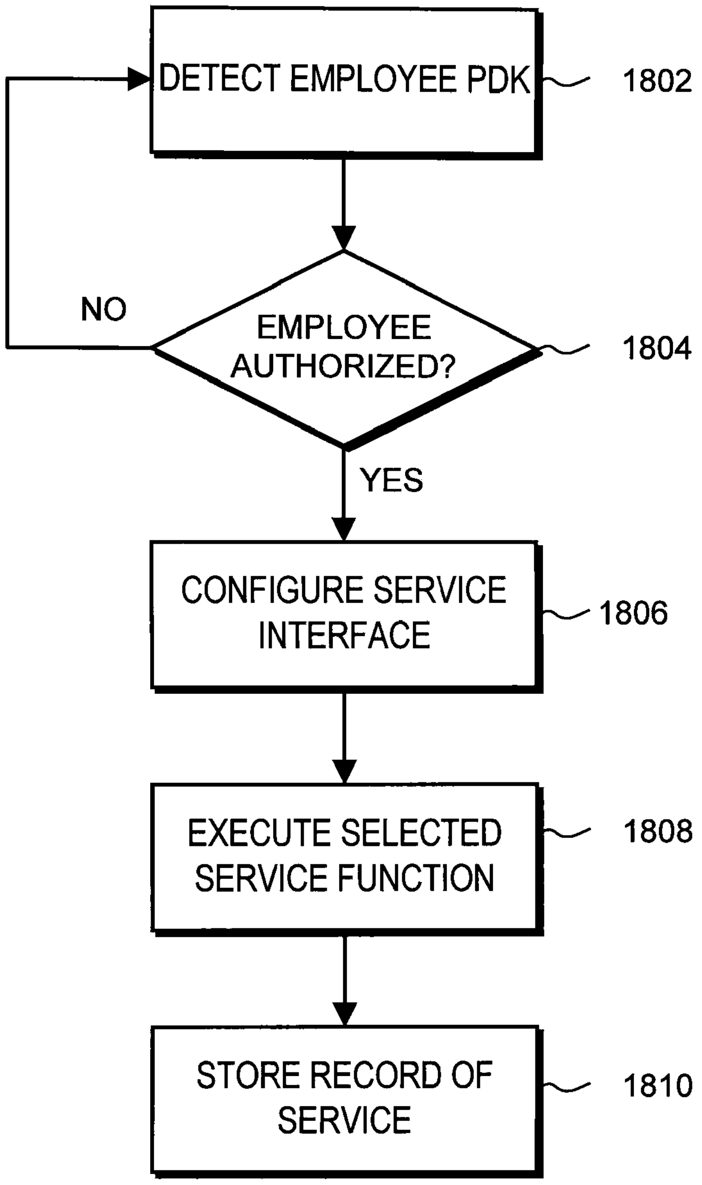
FIG. 18 is a flowchart illustrating an embodiment of a process for configuration of servicing tasks.

In another embodiment, the system can be used to improve the casino's ability to service gaming machines. For example, casino staff can provide maintenance tasks to machines without interrupting game play or disrupting the player. An example process is illustrated in FIG. 18. A service technician carries a PDK 102 that can be detected 1802 by a gaming machine coupled to a Reader 108. The configuration module 1202 recognizes that the PDK ID 212 is associated with a service technician and determines 1804 if the employee is authorized to access the machine. For certain types of maintenance tasks, a service technician may provide a form of biometric authentication to provide an additional level of security.

If the employee is authorized, the machine is reconfigured 1806 with a servicing interface. Service function are executed 1808 based on the employee's selections. A player PDK can remain in logical contact with the machine while the technician services the machine. In one embodiment, the player's and the technician's PDK IDs 212 as well as session and/or service data are stored 1810 to create an audit trail of the service. By employing authentication methods and storing an audit trail of the service performed, the system helps to prevent tampering with gaming devices.

In another embodiment, the system can be used to facilitate logging of hand pay transactions. When a patron wins a substantial jackpot on an electronic gaming machine, the patron is often hand paid the winnings by a casino staff. In one embodiment, the hand pay event can be recorded and closed once an authorized employee's PDK 102 is detected within range of the gaming machine. Alternatively, the employee's PDK 102 can be configured with a user interface when within range of the machine. The user interface prompts the employee to confirm that the hand pay was completed. After paying, the employee can press a button of the PDK 102 confirming payment. The event can then be time-stamped and logged in a database. Advantageously, the patron's PDK 102 can remain in contact with the gaming machine while the employee confirms the transaction so that the player's session is not interrupted.

In another embodiment, a PDK 102 of a staff member can be configured to display information about a player when the staff member approaches the player. For example, the staff member may be provided with the player's name and player rating. In one embodiment, multicolored LEDs on the staff member's PDK 102 or a nearby display can be used to denote the session state of a player and allow the staff member to cater services accordingly. For example, a red LED indicates the player is not currently in an active session, a yellow LED indicates the player is in proximity to a machine and a session about to begin, a green LED indicates the player is engaged in an active playing session and a blue LED indicates multiple sessions. These visual cues can be displayed on an employee's PDK or on a separate player tracking panel display.

Different types of employees can automatically receive different information about patrons in order to enhance customer service. For example, concierge staff, restaurant staff, valet staff, front desk staff and bell desk staff can each receive relevant customer information on their PDKs 102 or a nearby display when a customer approaches. For example, information for identifying a patron's automobile may be displayed to a valet attendant when the customer would like to retrieve his/her car. Employee PDKs 102 can also provide different employees access to different areas of the property and/or access to digital information based on their authorization level. For example, only authorized cashiers are granted access to a cashier cage. Other stations such as the front desk, bell desk or valet garage may also be restricted to employees authorized to work in those areas.

In yet another embodiment, the process is used to track casino assets such as, for example, cash boxes, carts, vehicles, components, chips, etc. In this embodiment, the PDK 102 is embedded or fixed to the asset. A log is kept to track the asset's movement around the casino using the location tracking methods described above. Furthermore, the casino can track precisely which individual is carrying the asset by detect an employee's PDK ID 212 at the same locations as the asset. Thus, the casino can detect if an asset is being moved by an unauthorized individual.

Figure 19:
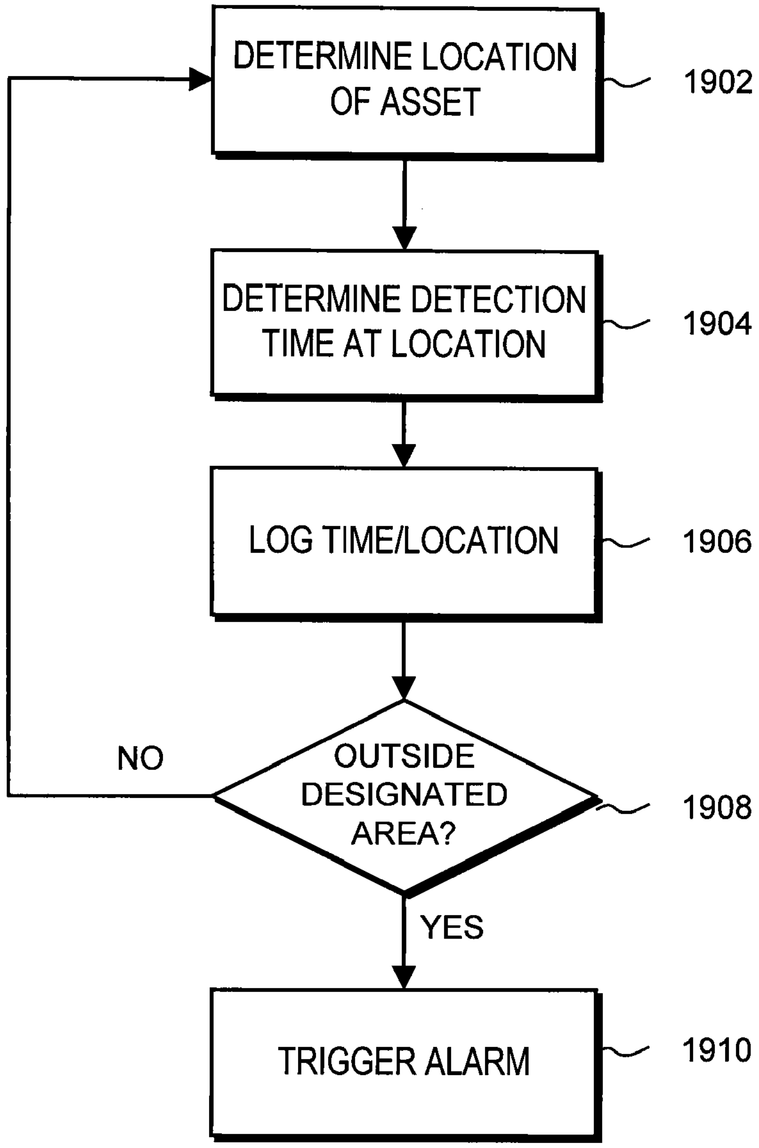
FIG. 19 is a flowchart illustrating an embodiment of a process for configuration of an asset tracking system.

An example process for tracking an asset is illustrated in FIG. 19. The configuration module 1202 determines 1902 the location of the asset and determines 1904 the time it is detected at the location. The time and location are logged 1906. In one embodiment, the state information associated with the asset may include a designated area of the property. If the asset is detected 1908 outside of the designated range, an alarm is triggered 1910.

In another embodiment, a PDK 102 can be embedded in a mobile gaming device. The mobile gaming device can be location tracked in order to ensure legal and regulatory-approved use of the devices. In one embodiment the mobile gaming device can be configured to only work in selected areas of the casino such as, for example, in areas where the security surveillance cameras are focused. Furthermore, the system can concurrently determine information about the user of the mobile gaming device. For example, the gaming device can be disabled if the user is below an age specified by mobile gaming regulations.

In one embodiment, self-service kiosks can enable a PDK holder to configure preferences for their PDK 102 or update account settings. For example, a user has the option of disabling PDK features 102 if they wish to carry the PDK 102 but not be detected by any RDCs 304. Furthermore, a player could disable only certain features of the PDK 102. For example, a player may wish to have his PDK 102 enabled, but hide selected information such as name, account information or various preferences.

As will be apparent to one of ordinary skill in the art, portions of the PDK memory may be initialized prior to distributing the PDK 102 to a patron. For example, the PDK 102 may be configured with its unique PDK ID 212 and may be initialized with user information, preferences, etc. based on information provided by the patron. In one embodiment, the distributor of the PDK (e.g., a casino, hotel or merchant) can pre-configure the PDK 102 to default settings specific to the distributor.

The order in which the steps of the methods of the present invention are performed is purely illustrative in nature. The steps can be performed in any order or in parallel, unless otherwise indicated by the present disclosure. The methods of the present invention may be performed in hardware, firmware, software or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

The invention claimed is:

1. A method for configuring operation of an electronic device coupled to a receiver/decoder circuit, the receiver/decoder circuit (RDC) adapted to wirelessly communicate with a personal digital key (PDK), the method comprising:

wirelessly detecting the PDK with the RDC;

receiving from the PDK a PDK identification code identifying the PDK;

determining one or more available functions executable by the electronic device;

receiving a profile from the PDK, the profile stored in the PDK and the profile including biometric data associated with a user; and configuring operation of the electronic device based on the one or more available functions executable by the electronic device, the PDK identification code and the user associated with the received profile, responsive to authenticating the PDK based on the PDK identification code and the user based on the biometric data.

2. The method of claim 1, wherein determining one or more available functions executable by the electronic device comprises:

receiving from the RDC an RDC identification code identifying the RDC.

3. The method of claim 2, wherein configuring operation of the electronic device is further based on the RDC identification code.

4. The method of claim 2, wherein the PDK is fixed to an asset, wherein configuring operation of the electronic device comprises configuring the electronic device to:

determine a location of the RDC based on location information stored in association with the RDC identification code;

determining a time that the PDK is detected by the RDC; and storing the location and the time of detection in a log to track movement of the asset.

5. The method of claim 1, wherein configuring operation of the electronic device comprises:

determining a user function executable by the electronic device; and configuring at least one of the electronic device and the PDK with a user interface based on the user function.

6. The method of claim 5, wherein determining a user function executable by the electronic device comprises:

determining PDK state information associated with the PDK identification code.

7. The method of claim 5, wherein determining a user function executable by the electronic device comprises:

determining RDC state information associated with an RDC identification code received from the RDC.

8. The method of claim 5, wherein configuring at least one of the electronic device and the PDK comprises:

displaying a menu on a viewing screen, the menu comprising a visual representation of the user function;

assigning a soft key to a menu option from the menu, wherein selection of the soft key causes the selected user function to execute.

9. The method of claim 5, further comprising:

executing an automated function based on the PDK identification code.

10. The method of claim 9, wherein executing an automated function comprises:

causing a personalized message to display on a viewing screen, the personalized message specific to a patron associated with the PDK identification code.

11. The method of claim 9, wherein executing an automated function comprises:

storing in an event log, the PDK identification code and a selected user function.

12. The method of claim 1, wherein configuring operation of the electronic device comprises configuring the electronic device to:

determine preferences of the user based on preference information stored in association with the PDK identification code; and alert a staff member of a patron's location and preferences and dispatch the staff member to the patron's location.

13. The method of claim 12, further comprising:

updating a location map carried by the staff member to indicate the patron's location in real time as the patron moves.

14. The method of claim 1, further comprising:

determining a location of the RDC; and responsive to determining that the asset moves outside of a designated allowed zone based on the location of the RDC, triggering an alarm.

15. The method of claim 1, wherein authentication of the user based on the biometric data is responsive to determining that a financial transaction meets a threshold.

16. The method of claim 1, further comprising:

wirelessly detecting another PDK with the RDC in addition to the PDK;

determining based on one or more differentiation metrics to configure the operation of the electronic device for the PDK rather than for the another PDK.

17. The method of claim 1, further comprising:

determining one or more of a profile and a sample type available to the PDK;

determining one or more authentication capabilities of the RDC based on the one or more of the profile and sample type available to the PDK;

determining the PDK and RDC are capable of authenticating the user based on the biometric data, wherein the biometric data is one or more of included in a profile available to the PDK and the sample type available to the PDK.

18. The method of claim 1, wherein the type of electronic device is one or more of a point of sale terminal, a locking device and an automated teller machine (ATM).

19. The method of claim 1, comprising:

determining a promotion for presentation to the user; and sending the promotion for presentation to the user via the electronic device.

20. A tracking system comprising:

a receiver/decoder circuit (RDC) associated with an electronic device, the RDC adapted to wirelessly receive a personal digital key (PDK) identification code from a PDK and to wirelessly receive a profile from the PDK, wherein the profile is stored on the PDK and includes biometric data associated with a user;

a configuration module adapted to communicate with the RDC, the configuration module receiving one or more available functions executable by the electronic device, the PDK identification code and the profile, and determining configuration data based on the one or more available functions executable by the electronic device, the PDK identification code and the received profile; and an electronic device adapted to receive the configuration data from the configuration module and operate according to instructions specified by the configuration data responsive to authentication of the PDK based on the PDK identification code and the user based on the biometric data.

21. The system of claim 20, wherein the configuration module comprises:

a PDK database storing PDK state information associated with the PDK identification code;

an RDC database storing RDC state information associated with an RDC identification code identifying the RDC; and decision logic adapted to receive the PDK state information and the RDC state information and determine the configuration data.

22. The system of claim 20, wherein the decision logic is further adapted to determine a user function executable by the electronic device based on at least one of the PDK state information and the RDC state information and determine configuration of a user interface of at least one of the electronic device and the PDK.

23. The system of claim 22, wherein the decision logic is further adapted to determine an assignment of a soft key to the user function.

24. The system of claim 20:

determining a location of the RDC; and responsive to determining that the asset moves outside of a designated allowed zone based on the location of the RDC, triggering an alarm.

25. A configuration module for configuring operation of an electronic device coupled to a receiver/decoder circuit (RDC), the RDC adapted to wirelessly communicate with a personal digital key (PDK) identifiable by a PDK identification code, the configuration module comprising:

a PDK database adapted to store PDK state information associated with the PDK identification code, the PDK state information identifying a type associated with the PDK and one or more preferences associated with the PDK;

a RDC database adapted to store RDC state information associated with the RDC, the RDC information including one or more available functions executable by the electronic device; and decision logic adapted to retrieve the PDK state information from the PDK database, the RDC state information from the RDC data base and determine configuration data specifying operation of the electronic device based on the PDK state information and the one or more available functions executable by the electronic device.

26. The configuration module of claim 25, further comprising:

an RDC database adapted to store RDC state information associated with an RDC identification code, the RDC identification code identifying the RDC; and wherein the decision logic further specifies the configuration data based on the RDC state information.

27. The configuration module of claim 25, wherein the decision logic is further adapted to determine a user function executable by the electronic device and configure at least one of the electronic device and the PDK with a user interface based on the user function.

28. The configuration module of claim 25, wherein the decision logic:

determines a location of the RDC; and responsive to determining that the asset moves outside of a designated allowed zone based on the location of the RDC, triggers an alarm.

* * * * *